United States Patent
Yu et al.

(10) Patent No.: US 12,456,869 B2
(45) Date of Patent: Oct. 28, 2025

(54) PHOTOVOLTAIC POWER GENERATION SYSTEM, PHOTOVOLTAIC INVERTER, AND IV CURVE SCANNING METHOD

(71) Applicant: Huawei Digital Power Technologies Co., Ltd., Shenzhen (CN)

(72) Inventors: Xinyu Yu, Shanghai (CN); Kai Xin, Shanghai (CN); Jianqiang Wang, Shanghai (CN); Song Wan, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 368 days.

(21) Appl. No.: 18/316,387

(22) Filed: May 12, 2023

(65) Prior Publication Data

US 2023/0291208 A1    Sep. 14, 2023

Related U.S. Application Data

(63) Continuation of application No. PCT/CN2021/112451, filed on Aug. 13, 2021.

(30) Foreign Application Priority Data

Nov. 13, 2020 (CN) .......................... 202011271440.2

(51) Int. Cl.
*H02J 3/46* (2006.01)
*H02J 3/00* (2006.01)
*H02S 50/10* (2014.01)

(52) U.S. Cl.
CPC ............... *H02J 3/46* (2013.01); *H02J 3/0012* (2020.01); *H02S 50/10* (2014.12); *H02J 2300/26* (2020.01)

(58) Field of Classification Search
CPC ........ H02J 3/46; H02J 3/0012; H02J 2300/26; H02J 1/106; H02J 3/24; H02J 3/381;
(Continued)

(56) References Cited

U.S. PATENT DOCUMENTS

| | | | |
|---|---|---|---|
| 2006/0017327 A1* | 1/2006 | Siri ........................... | G05F 1/67 307/43 |
| 2014/0077608 A1* | 3/2014 | Nosaka ................... | H02J 1/102 307/77 |
| 2022/0147091 A1* | 5/2022 | Liu ......................... | H02J 3/381 |

FOREIGN PATENT DOCUMENTS

| | | |
|---|---|---|
| CN | 106712716 A | 5/2017 |
| CN | 107017836 A | 8/2017 |

(Continued)

*Primary Examiner* — Rexford N Barnie
*Assistant Examiner* — Thai H Tran
(74) *Attorney, Agent, or Firm* — Maier & Maier, PLLC

(57) ABSTRACT

The photovoltaic power generation system includes a controller and M groups of DC-DC circuits. Each group of DC-DC circuits include N DC-DC circuits, where M is a positive integer, and N is an integer greater than 1. An input end of each DC-DC circuit is connected to at least one photovoltaic unit, and each photovoltaic unit includes at least one photovoltaic module. The controller controls the N DC-DC circuits in each group of DC-DC circuits to sequentially start online IV curve scanning and controls a time interval at which two adjacent DC-DC circuits start online IV curve scanning to be less than duration of online IV curve scanning performed by one DC-DC circuit. The photovoltaic power generation system can reduce a fluctuation of a power output during online IV curve scanning, reduce duration of online IV curve scanning performed by the photovoltaic power generation system.

20 Claims, 17 Drawing Sheets

(58) Field of Classification Search
CPC ...... H02J 2300/24; H02S 50/10; H02S 50/00; Y02E 10/56
See application file for complete search history.

(56) References Cited

FOREIGN PATENT DOCUMENTS

CN    107196604 A    9/2017
WO    2020093663 A1  5/2020

* cited by examiner

PHOTOVOLTAIC POWER GENERATION SYSTEM, PHOTOVOLTAIC INVERTER, AND IV CURVE SCANNING METHOD

CROSS-REFERENCE TO RELATED APPLICATIONS

This application is a continuation of International Application No. PCT/CN2021/112451, filed on Aug. 13, 2021, which claims priority to Chinese patent application number 202011271440.2, filed on Nov. 13, 2020. The disclosures of the aforementioned applications are hereby incorporated by reference in their entireties.

TECHNICAL FIELD

The embodiments relate to the field of photovoltaic power generation technologies, a photovoltaic power generation system, a photovoltaic inverter, a combiner box, a photovoltaic optimizer, and an IV curve scanning method.

BACKGROUND

Photovoltaic power generation is a technology that uses photovoltaic effect of a semiconductor interface to convert light energy into electric energy and has been developing rapidly. As a core component in a photovoltaic power generation system, a photovoltaic module is configured to convert light energy into electric energy. Therefore, a health status of the photovoltaic module directly affects energy yield of the photovoltaic power generation system. When environmental factors such as temperature and light intensity are fixed, an output current of the photovoltaic module varies with its output voltage, which can be drawn as a current-voltage curve (briefly referred to as an "IV curve" below).

FIG. 1 is a schematic diagram of an IV curve of a healthy photovoltaic module.

The IV curve of the healthy photovoltaic module is a parabolic curve. If a photovoltaic module is damaged or the photovoltaic module is covered, an IV curve of the photovoltaic module distorts. An IV curve scanning technology can be used to diagnose a health status of the photovoltaic module.

Currently, IV curve scanning technologies can be classified into an offline IV curve scanning technology and an online IV curve scanning technology. In the offline IV curve scanning technology, operation and maintenance personnel need to manually carry an IV detector beside a photovoltaic module, disconnect the photovoltaic module from a photovoltaic power generation system, and connect the photovoltaic module to an IV detector for detection. This method takes a long detection time, requires heavy workload, and causes a large power loss of the photovoltaic power generation system during detection. In the online IV curve scanning technology, online IV curve scanning is performed on a photovoltaic string connected to a power conversion circuit of a photovoltaic system. This can avoid a manual operation and reduce scanning time and a power loss of the photovoltaic power generation system during scanning.

However, in a current online IV curve scanning process, an input voltage of a photovoltaic string in a scanning state fluctuates, and an input power of the photovoltaic string fluctuates accordingly. As a result, an output power of an inverter, a Maximum power point tracking (MPPT) device, or the like connected to the photovoltaic string fluctuates accordingly, which affects grid-connected power quality of the photovoltaic power generation system, for example, may cause harmonics and voltage flicker.

SUMMARY

To resolve the foregoing problem, the embodiments may provide a photovoltaic power generation system, a photovoltaic inverter, a combiner box, a photovoltaic optimizer, and an IV curve scanning method, to reduce duration of online IV curve scanning, reduce a power fluctuation of the photovoltaic power generation system during online IV curve scanning, and further reduce impact of online IV curve scanning on grid-connected power quality.

According to a first aspect, the embodiments may provide a photovoltaic power generation system. The photovoltaic power generation system includes a controller and M groups of Direct Current (DC)-direct current circuits. Each group of DC-DC circuits include N DC-DC circuits, where M is a positive integer, and N is an integer greater than 1. An input end of each DC-DC circuit is connected to at least one photovoltaic unit, and each photovoltaic unit includes at least one photovoltaic module. The controller is configured to: control the N DC-DC circuits in each group of DC-DC circuits to sequentially start online IV curve scanning and control a time interval at which two adjacent DC-DC circuits start online IV curve scanning to be less than duration of online IV curve scanning performed by one DC-DC circuit.

For each group of DC-DC circuits of the photovoltaic power generation system, after a first DC-DC circuit starts online IV curve scanning, other DC-DC circuits sequentially perform online IV curve scanning rather than starting scanning after a previous DC-DC circuit completes scanning, and a time interval is less than duration of online IV curve scanning performed by a single DC-DC circuit, that is, interleaved scanning is implemented through control. In this case, N DC-DC circuits in each group of DC-DC circuits perform staggered output. On one hand, online IV curve scanning can be simultaneously performed on photovoltaic units connected to a plurality of DC-DC circuits. This saves scanning time. On the other hand, a total output power of the photovoltaic power generation system can be stable. This avoids a sharp fluctuation of the total output power during online IV curve scanning, and further reduces negative impact of online IV curve scanning on grid-connected power quality.

With reference to the first aspect, in a first possible implementation, when controlling each DC-DC circuit to perform online IV curve scanning, the controller first increases an input voltage of the DC-DC circuit until an input current of the DC-DC circuit is zero. In this case, the input voltage of the DC-DC circuit is a sum of open-circuit voltages of all connected photovoltaic units 10. Then, the controller controls the input voltage of the DC-DC circuit to gradually decrease to zero. In this process, a correspondence between the input voltage and the input current of the DC-DC circuit is obtained based on a preset sampling interval, to obtain an IV curve scanning result.

With reference to the first aspect, in a second possible implementation, the controller is configured to: after controlling a first DC-DC circuit in each group of DC-DC circuits to start online IV curve scanning, control a $k^{th}$ DC-DC circuit to start online IV curve scanning when an input voltage of a $(k-1)^{th}$ DC-DC circuit decreases to be less than a preset voltage threshold, so that the time interval is less than the duration of online IV curve scanning performed by one DC-DC circuit. k=2, 3, . . . , N.

For another DC-DC circuit except for the first DC-DC circuit in each group of DC-DC circuits, a time point for starting online IV curve scanning is a moment at which an input voltage of a previous DC-DC circuit decreases to be less than a preset voltage value, that is, the previous DC-DC circuit has not completed online IV curve scanning. Therefore, staggered output is implemented.

With reference to the first aspect, in a third possible implementation, duration of online IV curve scanning performed by all DC-DC circuits is the same, and the preset voltage threshold is a product of a first preset proportion and a sum of open-circuit voltages of all photovoltaic units connected to the $(k-1)^{th}$ DC-DC circuit. The sum of open-circuit voltages of all photovoltaic units connected to the $(k-1)^{th}$ DC-DC circuit is real-time measurement data of online IV curve scanning performed by the $(k-1)^{th}$ DC-DC circuit.

With reference to the first aspect, in a fourth possible implementation, the preset voltage threshold is a product of a first preset proportion and a sum of preset open-circuit voltages of photovoltaic units connected to the $(k-1)^{th}$ DC-DC circuit. A rated (Rated) open-circuit voltage range of each photovoltaic unit is a known device parameter. A preset open-circuit voltage of each photovoltaic unit may be determined based on the rated open-circuit voltage range. For example, a greatest value, a smallest value, or an intermediate value within the rated open-circuit voltage range is selected.

With reference to the first aspect, in a fifth possible implementation, the controller is configured to: after controlling a first DC-DC circuit in each group of DC-DC circuits to start online IV curve scanning, control other DC-DC circuits to sequentially start online IV curve scanning at a preset time interval. The preset time interval is less than the duration of online IV curve scanning performed by one DC-DC circuit. Therefore, a plurality of DC-DC circuits simultaneously perform scanning in a period of time after the first DC-DC circuit starts scanning, to perform staggered output.

With reference to the first aspect, in a sixth possible implementation, the preset time interval is negatively correlated to a value of N. More DC-DC circuits connected to the photovoltaic system indicate a higher power of the photovoltaic power generation system. In this case, the preset time interval may be reduced, to shorten duration of online IV curve scanning while maintaining a stable total output power of the photovoltaic power generation system.

With reference to the first aspect, in a seventh possible implementation, the preset time interval is a product of a second preset proportion and the duration of online IV curve scanning performed by one DC-DC circuit.

With reference to the first aspect, in an eighth possible implementation, the controller controls the M groups of DC-DC circuits to synchronously perform online IV curve scanning, that is, controls respective first DC-DC circuits of a plurality of groups of DC-DC circuits to simultaneously start scanning.

With reference to the first aspect, in a ninth possible implementation, the photovoltaic power generation system further includes a direct current-alternating current (DC-AC) circuit, and the DC-AC circuit and the M groups of DC-DC circuits form an inverter. Positive output ends of the M groups of DC-DC circuits are connected in parallel to a positive input end of the DC-AC circuit, and negative output ends of the M groups of DC-DC circuits are connected in parallel to a negative input end of the DC-AC circuit. The inverter is a string inverter.

With reference to the first aspect, in a tenth possible implementation, the controller is further configured to control a working status of the DC-AC circuit. In other words, the controller is integrated with a controller of the DC-AC circuit to form a controller of the inverter.

With reference to the first aspect, in an eleventh possible implementation, the M groups of DC-DC circuits form a DC combiner box, where positive output ends of the M groups of DC-DC circuits are connected in parallel to form a positive output end of the DC combiner box, and negative output ends of the M groups of DC-DC circuits are connected in parallel to form a negative output end of the DC combiner box.

With reference to the first aspect, in a twelfth possible implementation, the DC-DC circuit is a photovoltaic optimizer, and N photovoltaic optimizers in each group of photovoltaic optimizers form a photovoltaic optimizer substring. A positive output end of an $i^{th}$ photovoltaic optimizer is connected to a negative output end of an $(i-1)^{th}$ photovoltaic optimizer, a negative output end of the $i^{th}$ photovoltaic optimizer is connected to a positive output end of an $(i+1)^{th}$ photovoltaic optimizer, a positive output end of a first photovoltaic optimizer is a positive output end of the photovoltaic optimizer substring, a negative output end of an $N^{th}$ photovoltaic optimizer is a negative output end of the photovoltaic optimizer substring, and $i=2, 3, \ldots, N-1$. An output end of the photovoltaic optimizer substring may be connected to an input end of a downstream MPPT boost combiner box, a string inverter, or a central inverter through a DC power cable. A plurality of photovoltaic optimizer substrings may also be connected in series again.

According to a second aspect, the embodiments may further provide a photovoltaic inverter. The inverter is a string inverter. An input end of the inverter is connected to a photovoltaic unit. The photovoltaic unit includes at least one photovoltaic module. The photovoltaic inverter includes a controller, a DC-AC circuit, and M groups of DC-DC circuits. Each group of DC-DC circuits include N DC-DC circuits, where M is a positive integer, and N is an integer greater than 1. Positive output ends of the M groups of DC-DC circuits are connected in parallel to a positive input end of the DC-AC circuit, negative output ends of the M groups of DC-DC circuits are connected in parallel to a negative input end of the DC-AC circuit, and an input end of each DC-DC circuit is connected to at least one photovoltaic unit. The DC-DC circuit is configured to perform DC conversion on a DC obtained from the photovoltaic unit and then transmit a converted DC to the DC-AC circuit. The DC-AC circuit is configured to convert the obtained DC into an AC. The controller is configured to: control the N DC-DC circuits in each group of DC-DC circuits to sequentially start online IV curve scanning and control a time interval at which two adjacent DC-DC circuits start online IV curve scanning to be less than duration of online IV curve scanning performed by one DC-DC circuit.

For each group of DC-DC circuits of the photovoltaic inverter, after a first DC-DC circuit starts online IV curve scanning, other DC-DC circuits sequentially perform online IV curve scanning rather than starting scanning after a previous DC-DC circuit completes scanning. In addition, a time interval is less than duration of online IV curve scanning performed by the first DC-DC circuit, that is, interleaved scanning is implemented. In this case, N DC-DC circuits in each group of DC-DC circuits perform staggered output. On one hand, online IV curve scanning can be simultaneously performed on photovoltaic units connected to a plurality of DC-DC circuits. This saves scanning time.

On the other hand, a total output power of the photovoltaic inverter can be stable. This avoids a sharp fluctuation of the total output power during online IV curve scanning, and further reduces negative impact of the online IV curve scanning photovoltaic inverter on grid-connected power quality.

With reference to the second aspect, in a first possible implementation, when controlling each DC-DC circuit to sequentially perform online IV curve scanning, the controller first increases an input voltage of the DC-DC circuit until an input current of the DC-DC circuit is zero, and then controls the input voltage of the DC-DC circuit to gradually decrease to zero.

With reference to the second aspect, in a second possible implementation, the controller is configured to: after controlling a first DC-DC circuit in each group of DC-DC circuits to start online IV curve scanning, control a $k^{th}$ DC-DC circuit to start online IV curve scanning when an input voltage of a $(k-1)^{th}$ DC-DC circuit decreases to be less than a preset voltage threshold, so that the time interval is less than the duration of online IV curve scanning performed by one DC-DC circuit. k=2, 3, . . . , N.

With reference to the second aspect, in a third possible implementation, duration of online IV curve scanning performed by all DC-DC circuits is the same, and the preset voltage threshold is a product of a first preset proportion and a sum of open-circuit voltages of all photovoltaic units connected to the $(k-1)^{th}$ DC-DC circuit.

With reference to the second aspect, in a fourth possible implementation, the preset voltage threshold is a product of a first preset proportion and a sum of preset open-circuit voltages of photovoltaic units connected to the $(k-1)^{th}$ DC-DC circuit.

With reference to the second aspect, in a fifth possible implementation, the controller is configured to: after controlling a first DC-DC circuit in each group of DC-DC circuits to start online IV curve scanning, control other DC-DC circuits to sequentially start online IV curve scanning at a preset time interval, where the preset time interval is less than the duration of online IV curve scanning performed by one DC-DC circuit.

According to a third aspect, the embodiments may further provide a DC combiner box. An input end of the DC combiner box is connected to a photovoltaic unit. The photovoltaic unit includes at least one photovoltaic module. The DC combiner box includes a controller and M groups of DC-DC circuits. Each group of DC-DC circuits include N DC-DC circuits, where M is a positive integer, and N is an integer greater than 1. An input end of each DC-DC circuit is connected to at least one photovoltaic unit. Positive output ends of the M groups of DC-DC circuits are connected in parallel to form a positive output end of the DC combiner box, and negative output ends of the M groups of DC-DC circuits are connected in parallel to form a negative output end of the DC combiner box. The controller is configured to: control the N DC-DC circuits in each group of DC-DC circuits to sequentially start online IV curve scanning and control a time interval at which two adjacent DC-DC circuits start online IV curve scanning to be less than duration of online IV curve scanning performed by one DC-DC circuit.

With reference to the third aspect, in a first possible implementation, when controlling each DC-DC circuit to sequentially perform online IV curve scanning, the controller first increases an input voltage of the DC-DC circuit until an input current of the DC-DC circuit is zero, and then controls the input voltage of the DC-DC circuit to gradually decrease to zero.

With reference to the third aspect, in a second possible implementation, the controller is configured to: after controlling a first DC-DC circuit in each group of DC-DC circuits to start online IV curve scanning, control a $k^{th}$ DC-DC circuit to start online IV curve scanning when an input voltage of a $(k-1)^{th}$ DC-DC circuit decreases to be less than a preset voltage threshold, so that the time interval is less than the duration of online IV curve scanning performed by one DC-DC circuit. k=2, 3, . . . , N.

With reference to the third aspect, in a third possible implementation, duration of online IV curve scanning performed by all DC-DC circuits is the same, and the preset voltage threshold is a product of a first preset proportion and a sum of open-circuit voltages of all photovoltaic units connected to the $(k-1)^{th}$ DC-DC circuit.

With reference to the third aspect, in a fourth possible implementation, the preset voltage threshold is a product of a first preset proportion and a sum of preset open-circuit voltages of photovoltaic units connected to the $(k-1)^{th}$ DC-DC circuit.

With reference to the third aspect, in a fifth possible implementation, the controller is configured to: after controlling a first DC-DC circuit in each group of DC-DC circuits to start online IV curve scanning, control other DC-DC circuits to sequentially start online IV curve scanning at a preset time interval, where the preset time interval is less than the duration of online IV curve scanning performed by one DC-DC circuit.

According to a fourth aspect, the embodiments may further provide a photovoltaic optimizer, configured to connect to a photovoltaic unit. The photovoltaic unit includes at least one photovoltaic module. The photovoltaic unit is connected in series to at least one photovoltaic optimizer to form a photovoltaic optimizer substring. An output end of the photovoltaic optimizer substring may be connected to an input end of a downstream MPPT boost combiner box, a string inverter, or a central inverter through a DC power cable. The photovoltaic optimizer includes a controller and a DC-DC circuit. An input end of the DC-DC circuit is connected to at least one photovoltaic unit. A positive output end of the DC-DC circuit is a positive output end of the photovoltaic optimizer, and a negative output end of the DC-DC circuit is a negative output end of the photovoltaic optimizer. The controller is configured to: control the DC-DC circuit to start online IV curve scanning and control a time interval at which the DC-DC circuit and a previous serially-connected photovoltaic optimizer start online IV curve scanning to be less than duration of online IV curve scanning performed by one DC-DC circuit.

According to a fifth aspect, the embodiments may further provide an online IV curve scanning method, applied to the photovoltaic power generation system provided in the foregoing implementation. The method includes the following steps:

controlling N DC-DC circuits in each group of DC-DC circuits to sequentially start online IV curve scanning, and controlling a time interval at which two adjacent DC-DC circuits start online IV curve scanning to be less than duration of online IV curve scanning performed by one DC-DC circuit.

According to the method, after a first DC-DC circuit starts online IV curve scanning, other DC-DC circuits sequentially perform online IV curve scanning rather starting scanning after a previous DC-DC circuit completes scanning, and a time interval is less than duration of online IV curve scanning performed by a single DC-DC circuit, that is, interleaved scanning is implemented. In this case, N DC-DC circuits in each group of DC-DC circuits perform staggered output. On one hand, online IV curve scanning can be simultaneously performed on photovoltaic units connected to a plurality of DC-DC circuits. This saves scanning time. On the other hand, a total output power of a photovoltaic power generation system can be stable. This avoids a sharp fluctuation of the total output power during online IV curve scanning, and further reduces negative impact of online IV curve scanning on grid-connected power quality.

With reference to the fifth aspect, in a first possible implementation, the controlling a time interval at which two adjacent DC-DC circuits start online IV curve scanning to be less than duration of online IV curve scanning performed by one DC-DC circuit includes:

after controlling a first DC-DC circuit to start online IV curve scanning, controlling a $k^{th}$ DC-DC circuit to start online IV curve scanning when an input voltage of a $(k-1)^{th}$ DC-DC circuit decreases to be less than a preset voltage threshold, where k=2, 3, . . . , N.

With reference to the fifth aspect, in a second possible implementation, duration of online IV curve scanning performed by all DC-DC circuits is the same, and the preset voltage threshold is a product of a first preset proportion and a sum of open-circuit voltages of all photovoltaic units connected to the $(k-1)^{th}$ DC-DC circuit.

With reference to the fifth aspect, in a third possible implementation, the preset voltage threshold is a product of a first preset proportion and a sum of preset open-circuit voltages of photovoltaic units connected to the $(k-1)^{th}$ DC-DC circuit.

With reference to the fifth aspect, in a fourth possible implementation, the controlling a time interval at which two adjacent DC-DC circuits start online IV curve scanning to be less than duration of online IV curve scanning performed by one DC-DC circuit includes:

after controlling the first DC-DC circuit in each group of DC-DC circuits to start online IV curve scanning, controlling other DC-DC circuits to sequentially start online IV curve scanning at a preset time interval, where the preset time interval is less than the duration of online IV curve scanning performed by one DC-DC circuit.

With reference to the fifth aspect, in a fifth possible implementation, the preset time interval is a product of a second preset proportion and the duration of online IV curve scanning performed by one DC-DC circuit.

With reference to the fifth aspect, in a sixth possible implementation, the method further includes the following step:

controlling M groups of DC-DC circuits to synchronously perform online IV curve scanning.

DETAILED DESCRIPTION OF THE EMBODIMENTS

To make a person skilled in the art better understand the embodiments, the following first describes an application scenario.

An online IV curve scanning technology is applied to a photovoltaic power generation system provided in the embodiments. The following separately describes the technology with reference to different types of photovoltaic power generation systems.

The following first describes a photovoltaic power generation system based on a string inverter.

Figure 1:
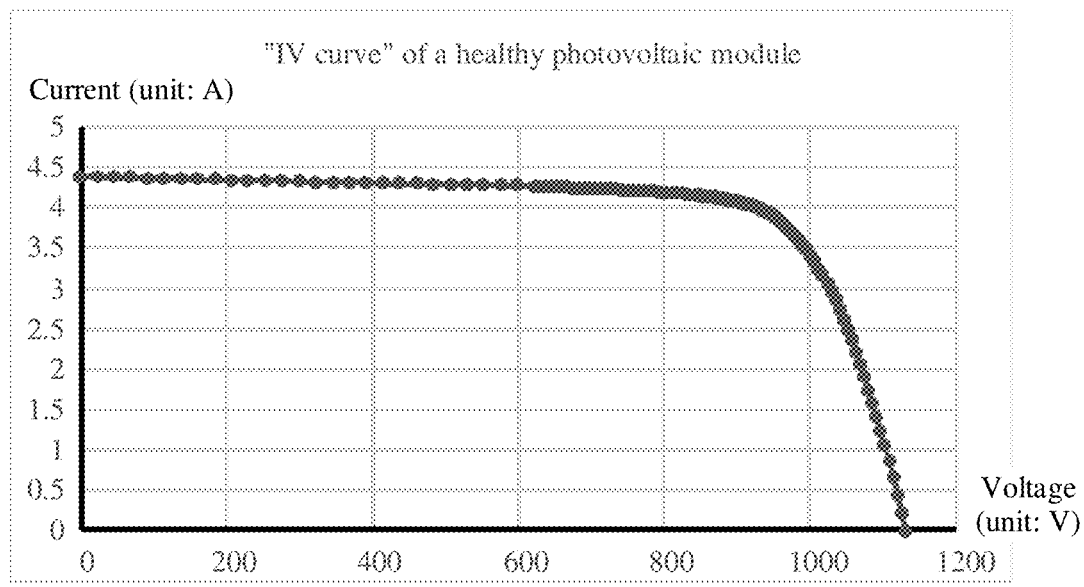
FIG. 1 is a schematic diagram of an IV curve of a healthy photovoltaic module.
Figure 2:
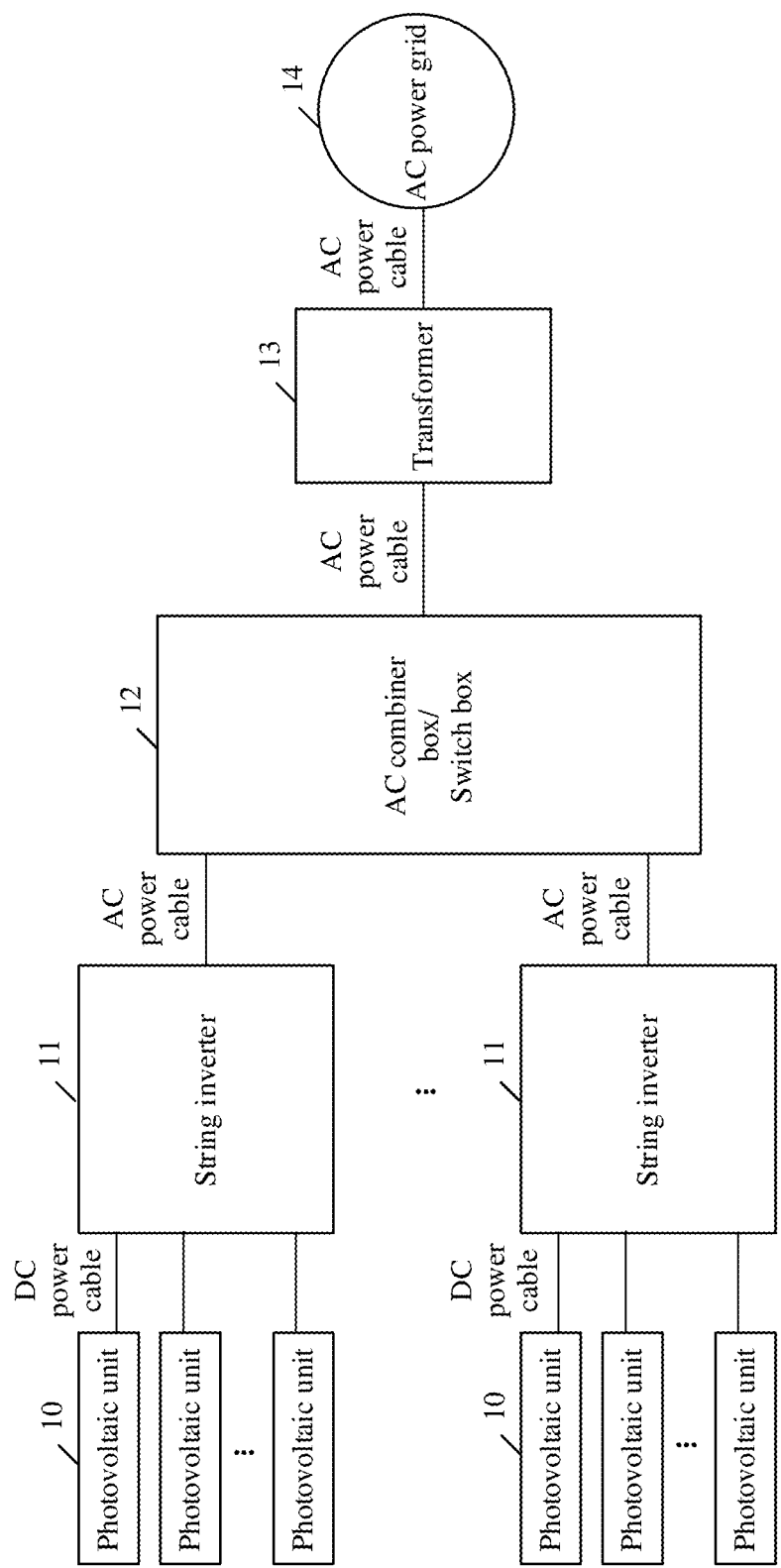
FIG. 2 is a schematic diagram of a photovoltaic power generation system based on a string inverter.

FIG. 2 is a schematic diagram of a photovoltaic power generation system based on a string inverter.

The photovoltaic power generation system includes a photovoltaic unit 10, a string inverter 11, an AC combiner box/switch box 12, and a transformer 13.

Each photovoltaic unit 10 includes one or more photovoltaic modules. The photovoltaic module is a DC power supply including solar cells packaged in series and in parallel.

When the photovoltaic unit 10 includes a plurality of photovoltaic modules, the plurality of photovoltaic modules may form one photovoltaic string in a manner in which a positive electrode and a negative electrode are connected in series in a head-to-tail manner, to form the photovoltaic unit 10. Alternatively, the plurality of photovoltaic modules may be first connected in series to form a plurality of photovoltaic strings, and then the plurality of photovoltaic strings may be connected in parallel to form the photovoltaic unit 10.

A DC side of the string inverter 11 is connected to one or more photovoltaic units 10. In actual application, the DC side of the string inverter 11 may be connected to a plurality of photovoltaic units 10.

The following describes the string inverter in detail.

Figure 3:
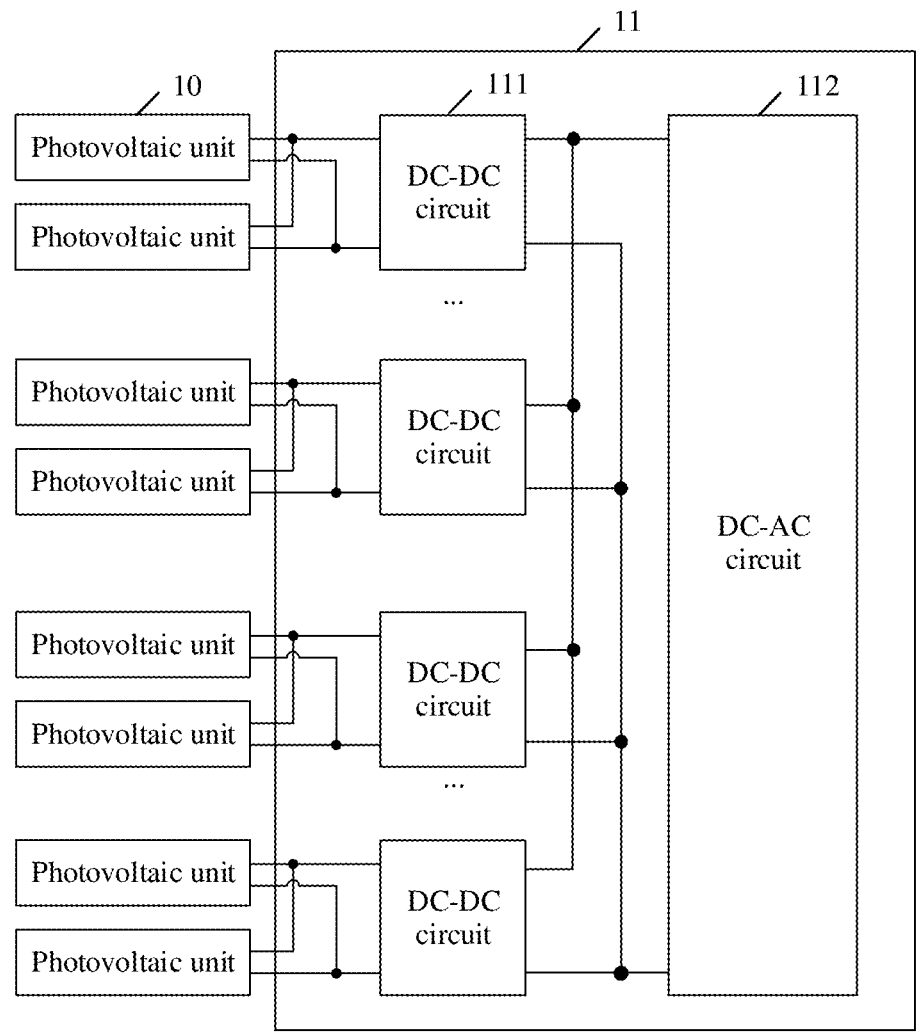
FIG. 3 is a schematic diagram of a string inverter.

FIG. 3 is a schematic diagram of a string inverter.

The string inverter 11 includes a two-stage power conversion circuit. A first-stage power conversion circuit is a DC-DC circuit 111, namely, a DC-DC boost circuit, and a second-stage power conversion circuit is a DC-AC circuit 112, namely, an inverter circuit. The string inverter 11 may include a plurality of DC-DC circuits 111, positive output ends of the plurality of DC-DC circuits 111 are connected in parallel to a positive input end on a DC side of the DC-AC circuit 112, and negative output ends of the plurality of DC-DC circuits 111 are connected in parallel to a negative input end on the DC side of the DC-AC circuit 112.

An AC cable outlet of the DC-AC circuit 112 is an output end of the string inverter 11.

Each DC-DC circuit 111 is connected to at least one photovoltaic unit 10, a positive input end of each DC-DC circuit 111 is connected to a positive electrode of the photovoltaic unit 10, and a negative input end of each DC-DC circuit 111 is connected to a negative electrode of the photovoltaic unit 10.

ACs output by a plurality of string inverters 11 are combined after flowing into the AC combiner box/switch box 12, and then connected to an AC power grid 14 by using the transformer 13. Alternatively, the ACs may be directly connected to a single-phase or three-phase AC power grid.

In an online IV curve scanning technology applied to the foregoing photovoltaic power generation system, an input voltage of the DC-DC circuit 111 in the string inverter 11 is controlled, to scan an output voltage of the photovoltaic unit, that is, implement IV curve scanning of the photovoltaic unit.

The following describes a photovoltaic power generation system based on a central inverter and an MPPT boost combiner box.

Figure 4:
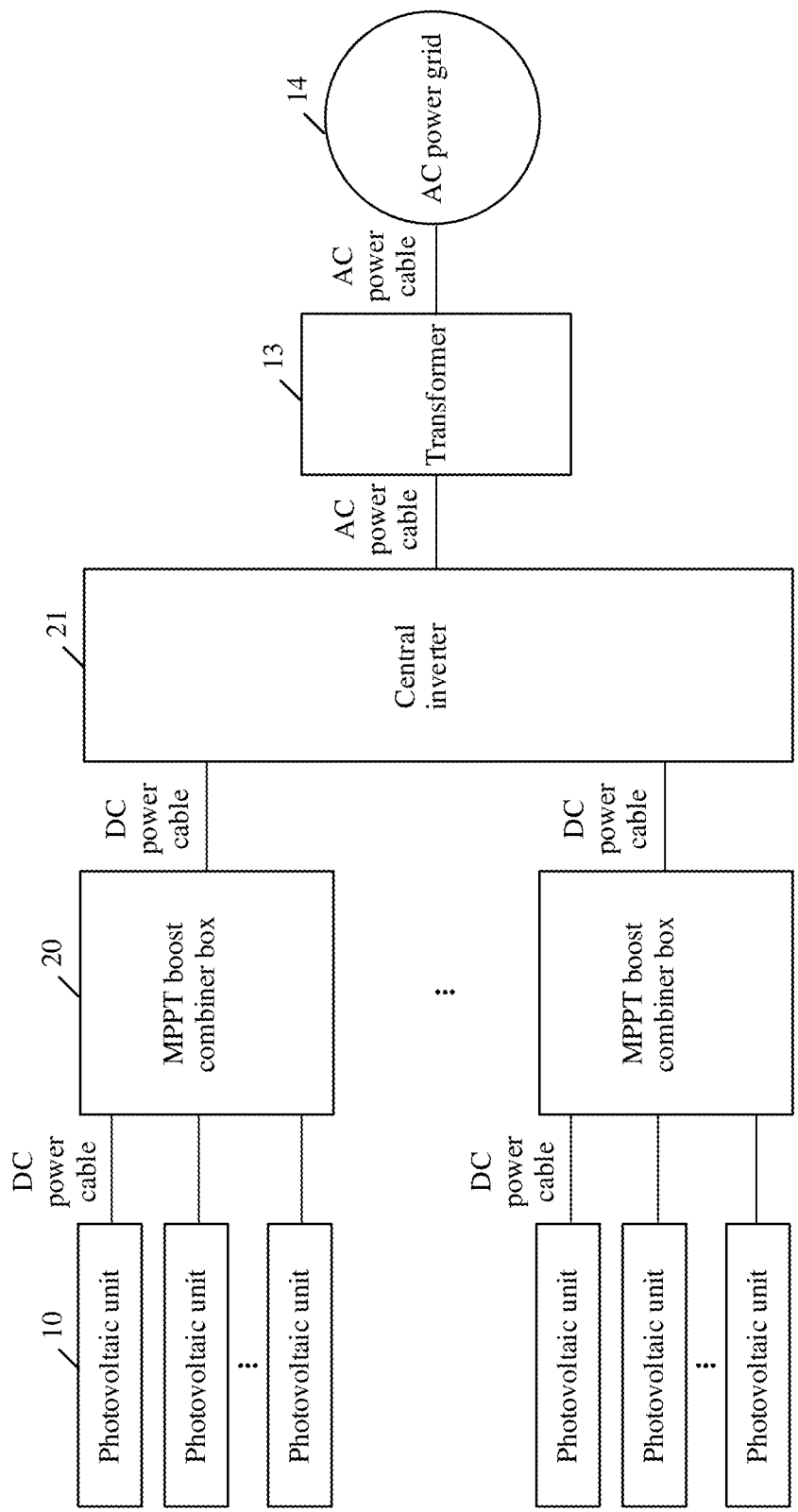
FIG. 4 is a schematic diagram of a photovoltaic power generation system based on a central inverter and an MPPT boost combiner box.

FIG. 4 is a schematic diagram of a photovoltaic power generation system based on a central inverter and an MPPT boost combiner box.

The photovoltaic power generation system shown in the figure includes the photovoltaic unit 10, an MPPT boost combiner box 20, a central inverter 21, and the transformer 13.

The MPPT boost combiner box is a DC-DC boost converter, which is described in detail below with reference to the accompanying drawings.

Figure 5:
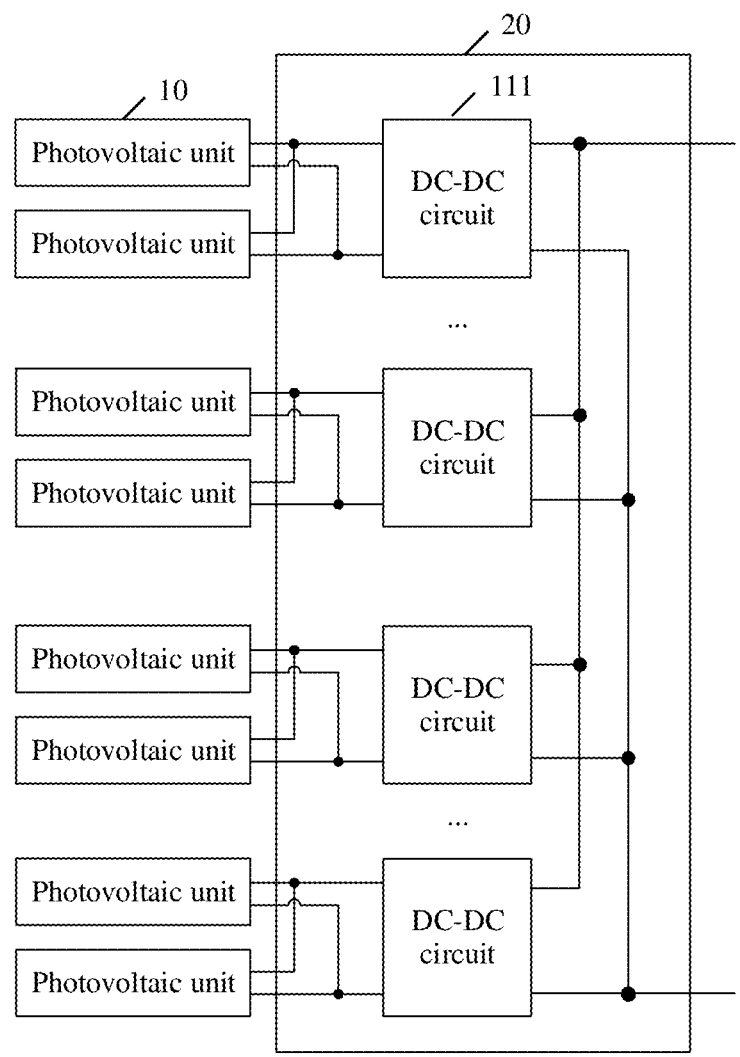
FIG. 5 is a schematic diagram of an MPPT boost combiner box.

FIG. 5 is a schematic diagram of an MPPT boost combiner box.

The MPPT boost combiner box 20 may include at least two DC-DC circuits 111. Each DC-DC circuit 111 is connected to at least one photovoltaic unit 10. A positive input end of each DC-DC circuit 111 is connected to a positive electrode of the photovoltaic unit 10, and a negative input end of the DC-DC circuit 111 is connected to a negative electrode of the photovoltaic unit 10.

Positive output ends of all DC-DC circuits 111 are connected in parallel to a positive electrode of an output DC bus, and negative output ends of all DC-DC circuits 111 are connected in parallel to a negative electrode of the output DC bus.

The positive electrode and the negative electrode of the DC bus are respectively used as a positive output end and a negative output end of the MPPT boost combiner box 20 and are connected to a positive input end and a negative input end of a downstream DC load or the central inverter 21 through a DC power cable.

The central inverter 21 is configured to convert a single DC input or a plurality of DC inputs connected in parallel to a DC side into an AC for output and may use DC-AC single-stage power conversion. An AC output by the central inverter 21 is fed into the AC power grid 14 after flowing through the transformer 13.

Because an electrical distance between the central inverter 21 and the photovoltaic unit 10 may be long, the DC-DC circuit 111 in the MPPT boost combiner box 20 needs to be used to control an output voltage of the photovoltaic unit, to implement IV curve scanning on the photovoltaic unit.

The following describes a photovoltaic power generation system based on a photovoltaic optimizer and a string inverter.

Figure 6:
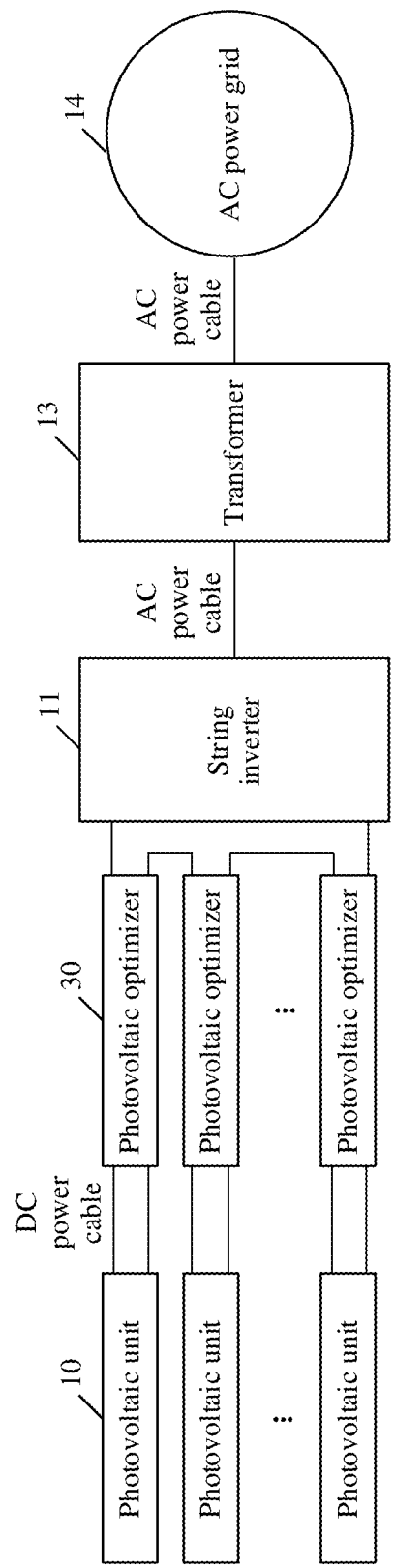
FIG. 6 is a schematic diagram of a photovoltaic power generation system based on a photovoltaic optimizer and a string inverter.

FIG. 6 is a schematic diagram of a photovoltaic power generation system based on a photovoltaic optimizer and a string inverter.

The photovoltaic power generation system shown in the figure includes the photovoltaic unit 10, a photovoltaic optimizer 30, the string inverter 11, an AC switch 31, and a power meter 32.

The photovoltaic optimizer 30 is a DC-DC converter. An input side of the photovoltaic optimizer 30 is connected to the photovoltaic unit 10, and an output side of the photovoltaic optimizer 30 is connected in series to the string inverter or the central inverter, to increase or decrease an output voltage of the photovoltaic unit. Connecting to the string inverter 11 is used as an example in FIG. 6.

The photovoltaic optimizer 30 includes a DC-DC circuit. The DC-DC circuit is a buck circuit, a boost circuit, or a BUCK-BOOST circuit. A positive input end of the DC-DC circuit is connected to a positive electrode of the photovoltaic unit 10, and a negative input end of the DC-DC circuit is connected to a negative electrode of the photovoltaic unit 10.

A positive electrode of the DC-DC circuit is connected to a positive electrode of an output DC bus and is used as a positive output end of the photovoltaic optimizer 30. A negative electrode of the DC-DC circuit is connected to a negative electrode of the output DC bus and is used as a negative output end of the photovoltaic optimizer 30.

In a photovoltaic power generation system in which the photovoltaic optimizer 30 is used, a plurality of photovoltaic optimizers 30 may be connected in series to form a substring.

For example, N photovoltaic optimizers are connected in series in a head-to-tail manner. A positive output end of an $i^{th}$ photovoltaic optimizer is connected to a negative output end of an $(i-1)^{th}$ photovoltaic optimizer, and a negative output end of the $i^{th}$ photovoltaic optimizer is connected to a positive output end of an $(i+1)^{th}$ photovoltaic optimizer, where i=2, 3, . . . , N-1. A positive output end of a first photovoltaic optimizer is used as a positive output end of a photovoltaic optimizer substring, and a negative output end of an $N^{th}$ photovoltaic optimizer is used as a negative output end of the photovoltaic optimizer substring. The output end of the photovoltaic optimizer substring is connected to an input end of a downstream MPPT boost combiner box, the string inverter, or the central inverter through a DC power cable. Connecting to the string inverter 11 is used as an example in the figure.

An AC output by the string inverter 11 is fed into the AC power grid after flowing through the transformer 13.

During online IV curve scanning, IV curve scanning is performed on a photovoltaic unit connected to a DC-DC circuit in the string inverter 11 in FIG. 2, a photovoltaic unit connected to a DC-DC circuit in the MPPT boost combiner box 20 in FIG. 4, and a photovoltaic unit connected to a DC-DC circuit in the string inverter 11 in FIG. 6.

In an implementation, a plurality of DC-DC circuits may sequentially perform IV curve scanning one by one in a serial scanning manner. They may first perform IV curve scanning on a photovoltaic unit connected to a first DC-DC circuit, then perform IV curve scanning on a photovoltaic unit connected to a second DC-DC circuit, and so on, until scanning on all photovoltaic units is completed.

The serial scanning manner takes a long time. During scanning, a light condition may fluctuate due to an environment change, which affects an obtained scanning curve and a diagnosis result. In addition, an output power of the photovoltaic converter continuously fluctuates during scanning, which reduces grid-connected power quality of the photovoltaic power generation system.

In another possible implementation, a parallel scanning manner is used. IV curve scanning is simultaneously performed on photovoltaic units connected to a plurality of DC-DC circuits. Although this manner reduces scanning time, an output power of the photovoltaic converter sharply fluctuates during scanning, which greatly reduces grid-connected power quality of the photovoltaic power generation system.

To resolve the foregoing problem, the embodiments may provide a photovoltaic power generation system, a photovoltaic inverter, a combiner box, a photovoltaic optimizer, and an IV curve scanning method, so that IV curve scanning can be simultaneously performed on photovoltaic units connected to a plurality of DC-DC circuits. This saves scanning time, can avoid a sharp fluctuation of a total output power of the photovoltaic power generation system during online IV curve scanning, and further reduces negative impact of online IV curve scanning on grid-connected power quality.

The following describes in detail the embodiments with reference to accompanying drawings.

The terms "first", "second", and the like in the following descriptions are used only for a purpose of description and shall not be understood an indication or implication of relative importance or implicit indication of a quantity of indicated characteristics.

Unless otherwise clearly specified and limited, a term "connection" should be understood in a broad sense. For example, a "connection" may be a fixed connection, a detachable connection, or an integrated connected, may be a direct connection, or may be an indirect connection implemented by using a medium.

Figure 7:
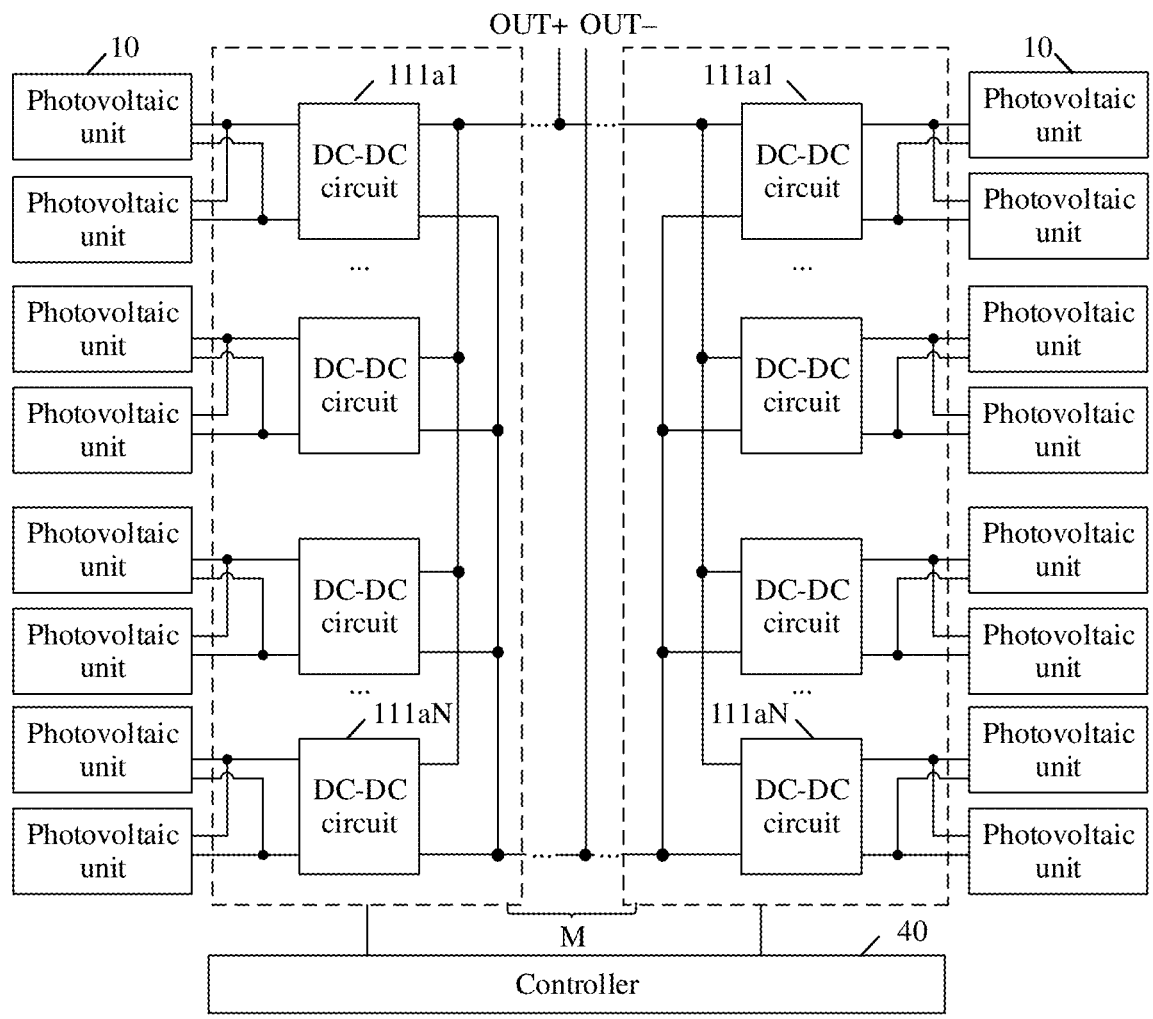
FIG. 7 is a schematic diagram of a photovoltaic power generation system according to an embodiment.

FIG. 7 is a schematic diagram of a photovoltaic power generation system according to an embodiment.

The photovoltaic power generation system includes the photovoltaic unit 10, a controller 40, and M groups of DC-DC circuits.

M is a positive integer.

Each group of DC-DC circuits include N DC-DC circuits 111a1 to 111aN.

N is a positive integer greater than 1.

The photovoltaic unit 10 includes at least one photovoltaic module. When the photovoltaic unit 10 includes a plurality of photovoltaic modules, the plurality of photovoltaic modules may form one photovoltaic string in a manner in which a positive electrode and a negative electrode are connected in series in a head-to-tail manner, to form the photovoltaic unit 10. Alternatively, the plurality of photovoltaic modules may be first connected in series to form a plurality of photovoltaic strings, and then the plurality of photovoltaic strings may be connected in parallel to form the photovoltaic unit 10. A quantity of photovoltaic modules included in the photovoltaic unit is not limited in this embodiment.

An input end of each DC-DC circuit is connected to at least one photovoltaic unit 10, a positive input end of the DC-DC circuit is connected to a positive electrode of the photovoltaic unit 10, and a negative input end of the DC-DC circuit is connected to a negative electrode of the photovoltaic unit 10.

The DC-DC circuit is configured to perform DC conversion on a DC input by the photovoltaic unit 10 and then output a converted DC.

The controller 40 is configured to: control each group of DC-DC circuits to sequentially start online IV curve scanning and control a time interval at which two adjacent DC-DC circuits start online IV curve scanning to be less than duration of online IV curve scanning performed by one DC-DC circuit. Details are described below.

When the controller 40 controls the N DC-DC circuits 111a1 to 111aN in each group of DC-DC circuits to sequentially perform scanning, the DC-DC circuit 111a1 first starts online IV curve scanning, the DC-DC circuit 111a2 starts online IV curve scanning after $T_1$, the DC-DC circuit 111a3 starts online IV curve scanning after $T_2$, ..., and the DC-DC circuit 111aN starts online IV curve scanning after $T_{N-1}$. In this case, $T_1$, $T_2$, ..., and $T_{N-1}$ indicate time intervals. To indicates the duration of online IV curve scanning performed by one DC-DC circuit. In this case, $T_1$, $T_2$, ..., and $T_{N-1}$ may all be less than $T_0$.

A size of the time interval is not limited in this embodiment. In addition, the foregoing time intervals $T_1$, $T_2$, ..., and $T_{N-1}$ may be the same or may be different. This is not limited in this embodiment. In an implementation, the foregoing time intervals are the same, to further reduce a fluctuation of a total output power of the N DC-DC circuits during online IV curve scanning and facilitate control.

It should be noted that adjacent in this solution is not adjacent in a physical location but is adjacent in a sequence of starting IV curve scanning.

The controller 40 may be an Application-Specific Integrated Circuit (ASIC), a Programmable Logic Device (PLD), a Digital Signal Processor (DSP), or a combination thereof. The PLD may be a Complex Programmable Logic Device (CPLD), a Field-programmable Gate Array (FPGA), Generic Array Logic (GAL), or any combination thereof. This is not limited in this embodiment.

Each group of DC-DC circuits 111a1 to 111aN include a controllable switching transistor. A type of the controllable switching transistor is not limited in this embodiment, for example, may be an Insulated Gate Bipolar Transistor (IGBT), a Metal-Oxide Semiconductor Field-Effect Transistor (MOSFET), or a Silicon Carbide Metal Oxide Semiconductor (SiC MOSFET). The controller 40 may send a control signal to the controllable switching transistor to control a working status of the controllable switching transistor. The control signal may be a Pulse Width Modulation (PWM) signal, a Pulse Frequency Modulation (PFM) signal, or the like. This is not limited in this embodiment.

In conclusion, the photovoltaic power generation system controls N DC-DC circuits in each group of DC-DC circuits to sequentially start online IV curve scanning After a first group of DC-DC circuits start online IV curve scanning, other DC-DC circuits perform interleaved scanning rather than starting scanning after a previous DC-DC circuit completes scanning. A time interval of starting scanning is less than duration of online IV curve scanning performed by one DC-DC circuit. In this case, the N DC-DC circuits perform staggered output. On one hand, online IV curve scanning can be simultaneously performed on photovoltaic units connected to a plurality of DC-DC circuits. This saves scanning time. On the other hand, a total output power of the photovoltaic power generation system can be stable. This avoids a sharp fluctuation of the total output power during online IV curve scanning, and further reduces negative impact of online IV curve scanning on grid-connected power quality.

Application scenarios may include a large photovoltaic plant scenario, a small and medium distributed photovoltaic plant scenario, a residential photovoltaic power generation system, and the like.

The following provides a description with reference to the implementations. In the embodiments, M=1 is used as an example in the following description. A principle when M is an integer greater than 1 is similar, and details are not described one by one. In addition, quantities of photovoltaic units 10 connected to all DC-DC circuits are the same in the following description.

Figure 8:
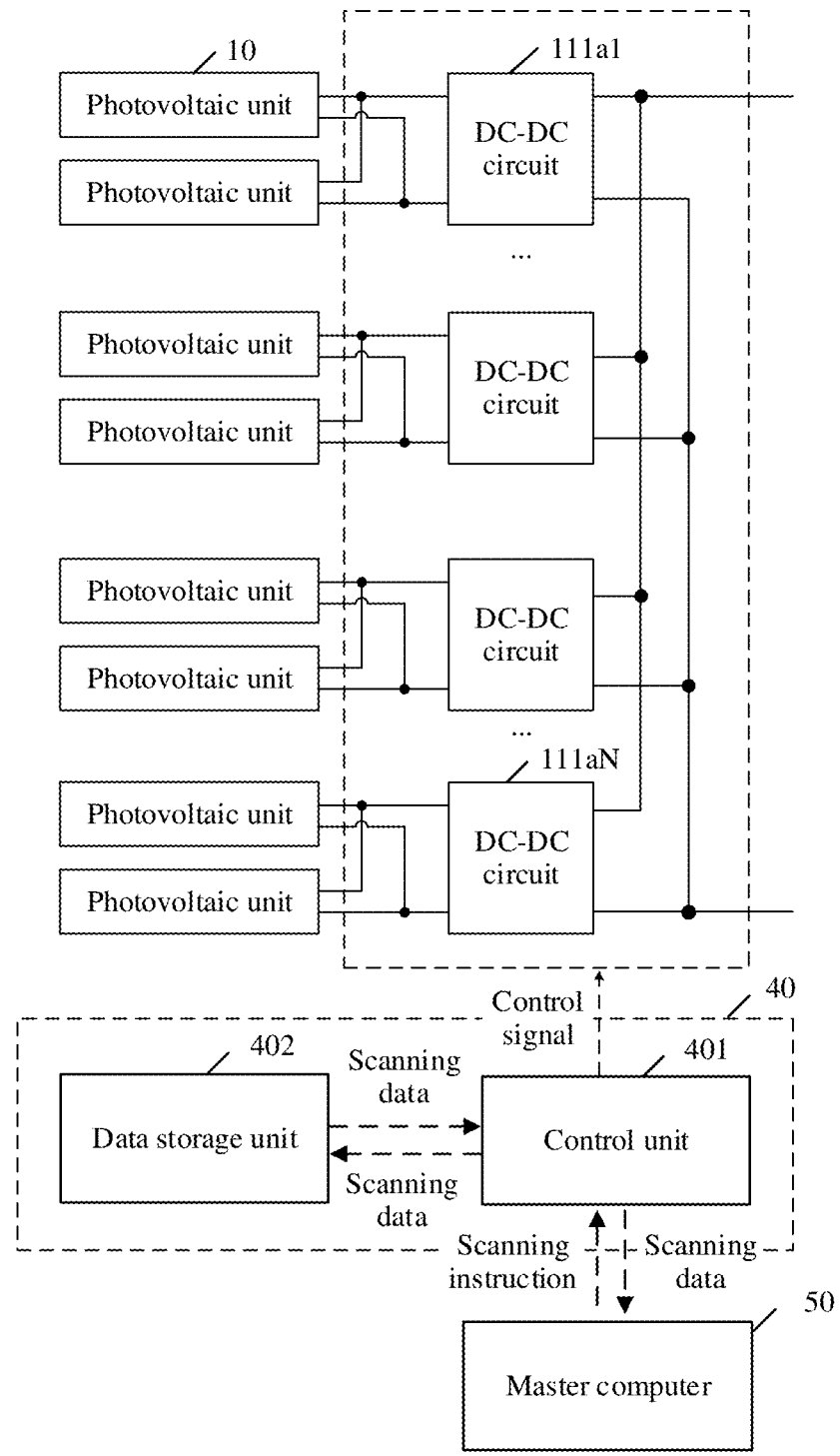
FIG. 8 is a schematic diagram of another photovoltaic power generation system according to an embodiment.

FIG. 8 is a schematic diagram of another photovoltaic power generation system according to an embodiment.

The controller 40 includes a control unit 401 and a data storage unit 402. The control unit 401 is configured to control N DC-DC circuits to perform online IV curve scanning, that is, the control unit 401 may control working statuses of the N DC-DC circuits.

The data storage unit 402 includes a memory, and the memory may include a Volatile Memory (VM), for example, a Random-access Memory (RAM). Alternatively, the memory may include a Non-volatile Memory (NVM), for example, a Read-only Memory (ROM), a flash memory, a hard disk drive (HDD), or a Solid-state Drive (SSD). The memory may further include a combination of the foregoing types of memories. The memory may be one memory or may include a plurality of memories. Scanning data may be transmitted between the control unit 401 and the data storage unit 402.

A master computer 50 is a computer that can directly send a control command, and is configured to deliver, to the controller, a scanning instruction for performing online IV curve scanning.

After obtaining the scanning instruction delivered by the master computer 50, the controller 40 starts online IV curve scanning. When the control unit 401 of the controller controls the N DC-DC circuits to sequentially perform scanning, control may be performed based on a voltage or time interval. Details are described below.

Manner 1: Control is performed based on the voltage.

When controlling each DC-DC circuit to perform online IV curve scanning, the control unit 401 first increases an input voltage of the DC-DC circuit until an input current of the DC-DC circuit is zero. In this case, the input voltage of the DC-DC circuit is a sum of open-circuit voltages of all connected photovoltaic units 10. In this case, the control unit 401 obtains the open-circuit voltage and transmits a result to the master computer 50 and/or stores the result in the data storage unit 402.

Then, the control unit 401 controls the input voltage of the DC-DC circuit to gradually decrease to zero, and in this process, obtains a correspondence between the input voltage and the input current of the DC-DC circuit based on a preset sampling interval, to obtain an IV curve scanning result. When the input voltage is zero, a corresponding input current is a sum of short-circuit currents of all photovoltaic units 10 connected to the DC-DC circuit.

The scanning result may be transmitted to the master computer 50 and/or stored in the data storage unit 402.

An implementation of controlling the input voltage of the DC-DC circuit to gradually decrease to zero is not limited in this embodiment, but this implementation needs to present an overall decrease rule. For example, in some embodiments, when controlling the input voltage to decrease, the control unit 401 may control the input voltage to first decrease, remain unchanged, and then decrease. This process is repeated until the input voltage decreases to zero.

The control unit 401 first controls a first DC-DC circuit in the N DC-DC circuits to start online IV curve scanning, and controls a $k^{th}$ DC-DC circuit in the remaining (N−1) DC-DC circuits to start online IV curve scanning when an input voltage of a $(k-1)^{th}$ DC-DC circuit decreases to be less than a preset voltage threshold, so that a time interval is less than duration of online IV curve scanning performed by one DC-DC circuit. k=2, 3, . . . , N.

For ease of understanding, the following uses an example in which a value of N is 4 for description. A principle is similar when N is another value.

Figure 9:
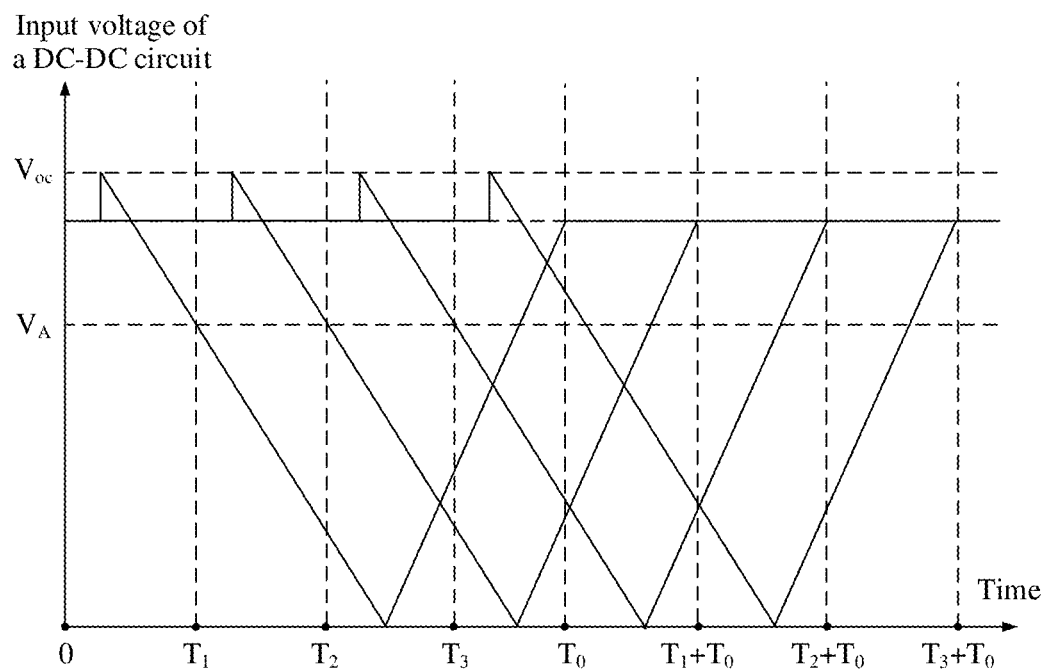
FIG. 9 is a schematic diagram 1 of a time sequence in which a DC-DC circuit starts scanning according to an embodiment.

FIG. 9 is a schematic diagram 1 of a time sequence in which a DC-DC circuit starts scanning according to an embodiment.

$V_{oc}$ indicates a sum of open-circuit voltages of all photovoltaic units 10 connected to each DC-DC circuit, and $V_A$ indicates the preset voltage threshold.

The first DC-DC circuit starts online IV curve scanning at a moment 0 (namely, an initial moment). The control unit 401 first controls an input voltage of the first DC-DC circuit to increase until an input current of the DC-DC circuit is zero, and then controls the input voltage of the DC-DC circuit to gradually decrease. When the input voltage decreases to be less than the preset voltage threshold $V_A$ at a moment $T_1$, the control unit 401 controls a second DC-DC circuit to start online IV curve scanning By analogy, an input voltage of the second DC-DC circuit decreases to be less than the preset voltage threshold $V_A$ at a moment $T_2$, and the control unit 401 controls a third DC-DC circuit to start online IV curve scanning. An input voltage of the third DC-DC circuit decreases to be less than the preset voltage threshold $V_A$ at a moment $T_3$, and the control unit 401 controls a fourth DC-DC circuit to start online IV curve scanning.

It can be learned from FIG. 9 that, within the moment $T_1$ to the moment $T_2+T_0$, a plurality of DC-DC circuits may simultaneously perform scanning. In addition, the plurality of DC-DC circuits may perform staggered output, so that a total output power of the photovoltaic power generation system during scanning can be stable, and a fluctuation is reduced. In addition, when N is 4, if an existing serial IV curve online scanning technology is used, required duration is $4T_0$, and scanning duration shown in the figure is $T_3+T_0$. That is, the solution provided in this embodiment can further shorten duration of online IV curve scanning.

In some embodiments, the preset voltage threshold is positively correlated to the value of N. More DC-DC circuits connected to the photovoltaic system indicate a higher power of the photovoltaic power generation system. In this case, the preset voltage threshold may be increased, to shorten duration of online IV curve scanning while maintaining a stable total output power of the photovoltaic power generation system.

For example, in a possible implementation, when five DC-DC circuits are turned on, the preset voltage threshold is $V_{A1}$. When 10 DC-DC circuits are turned on, the preset time interval is $V_{A2}$. In this case, $V_{A1}<V_{A2}$.

A correspondence between the preset voltage threshold and a quantity N of DC-DC circuits may be predetermined and stored in the data storage unit 402.

In some embodiments, a moment for starting online IV curve scanning is determined based on $V_{oc}$ obtained when a previous DC-DC circuit performs IV curve scanning. In other words, the preset voltage threshold is a product of a first preset proportion and a sum of open-circuit voltages of all photovoltaic units connected to the $(k-1)^{th}$ DC-DC circuit.

The first preset proportion may be determined based on an actual situation. This is not limited in this embodiment.

In some other embodiments, the preset voltage threshold is a product of a first preset proportion and a sum of preset open-circuit voltages of photovoltaic units connected to the $(k-1)^{th}$ DC-DC circuit. A rated (Rated) open-circuit voltage range of each photovoltaic unit is a known device parameter. A preset open-circuit voltage of each photovoltaic unit may be determined based on the rated open-circuit voltage range. For example, a greatest value, a smallest value, or an intermediate value within the rated open-circuit voltage range is selected.

Manner 2: Control is performed based on the time interval.

The control unit 401 first controls a first DC-DC circuit to start online IV curve scanning, and then controls other DC-DC circuits to sequentially start online IV curve scanning at a preset time interval.

The preset time interval is less than duration of online IV curve scanning performed by one DC-DC circuit.

When controlling one DC-DC circuit to perform online IV curve scanning, the control unit 401 first increases an input voltage of the DC-DC circuit until an input current of the DC-DC circuit is zero. In this case, the input voltage of the DC-DC circuit is a sum $V_{oc}$ of open-circuit voltages of all connected photovoltaic units 10. In this case, the control unit 401 obtains the open-circuit voltage $V_{oc}$ and transmits a detection result to the master computer 50 and/or stores the detection result in the data storage unit 402.

Then, the control unit 401 controls the input voltage of the DC-DC circuit to gradually decrease to zero, and in this process, obtains a correspondence between the input voltage and the input current of the DC-DC circuit based on a preset sampling interval, to obtain an IV curve scanning result. When the input voltage is zero, a corresponding input current is a sum of short-circuit currents of all photovoltaic units 10 connected to the DC-DC circuit. The scanning result may be transmitted to the master computer 50 and/or stored in the data storage unit 402.

An implementation of controlling the input voltage of the DC-DC circuit to gradually decrease to zero is not limited in this embodiment, but presents a decrease rule on the whole.

For ease of understanding, the following continues to use an example in which a value of N is 4 for description. A principle is similar when N is another value.

Figure 10:
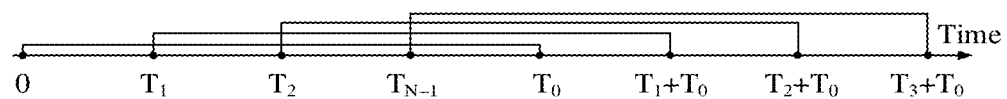
FIG. 10 is a schematic diagram 2 of a time sequence in which a DC-DC circuit starts scanning according to an embodiment.

FIG. 10 is a schematic diagram 2 of a time sequence in which a DC-DC circuit starts scanning according to an embodiment.

A first DC-DC circuit starts online IV curve scanning at a moment 0 (namely, an initial moment), a second DC-DC circuit starts online IV curve scanning after $T_1$, a third DC-DC circuit starts online IV curve scanning after $T_2$, and a fourth DC-DC circuit starts online IV curve scanning after $T_3$. $T_1$, $T_2$, and $T_3$ indicate preset time intervals, and all the preset time intervals may be the same or different. To indicates the duration of online IV curve scanning performed by one DC-DC circuit. In this case, all the preset time intervals are less than $T_0$.

It can be learned from FIG. 10 that, in a process of performing online IV curve scanning, a plurality of DC-DC circuits may simultaneously perform scanning. When controlling each DC-DC circuit to perform online IV curve scanning, the control unit 401 first increases an input voltage of the DC-DC circuit until an input current of the DC-DC circuit is zero, and then controls the input voltage of the DC-DC circuit to gradually decrease to zero. Therefore, a plurality of DC-DC circuits may perform staggered output, so that a total output power of the photovoltaic power generation system during scanning can be stable.

In some embodiments, the preset time interval is negatively correlated to the value of N. More DC-DC circuits connected to the photovoltaic system indicate a higher power of the photovoltaic power generation system. In this case, the preset time interval may be reduced, to shorten duration of online IV curve scanning while maintaining a stable total output power of the photovoltaic power generation system.

For example, in a possible implementation, the control unit 401 controls, at a same preset time interval, the plurality of DC-DC circuits to sequentially perform scanning. When five DC-DC circuits are turned on, preset time intervals $T_1$, $T_2$, $T_3$, and $T_4$ are the same and are all $\Delta T_1$. When 10 DC-DC circuits are turned on, preset time intervals $T_1$, $T_2$, ..., and $T_9$ are the same and are all $\Delta T_2$. In this case, $\Delta T_2 < \Delta T_1$.

For another example, in another possible implementation, the control unit 40 controls, at different preset time intervals, the plurality of DC-DC circuits to sequentially perform scanning. When four DC-DC circuits are turned on, preset time intervals are respectively $T_1$, $T_2$, and $T_3$. When 10 DC-DC circuits are turned on, preset time intervals are respectively $t_1$, $t_2$, $t_3$, ..., and $t_9$. In this case, $t_1 < T_1$, $t_2 < T_2$, and $t_3 < T_3$.

A correspondence between the preset time interval and a quantity N of DC-DC circuits may be predetermined and stored in the data storage unit 402.

In some embodiments, the preset time interval is a product of a second preset proportion and the duration of online IV curve scanning performed by one DC-DC circuit. The second preset proportion may be determined based on an actual situation. This is not limited in this embodiment.

In the foregoing description, an example in which the photovoltaic power generation system includes one group of DC-DC circuits is used for description. When the photovoltaic power generation system includes a plurality of groups of DC-DC circuits, the controller 40 can control the plurality of groups of DC-DC circuits to synchronously perform online IV curve scanning, that is, controls respective first DC-DC circuits of the plurality of groups of DC-DC circuits to simultaneously start scanning.

The following describes an effect of the photovoltaic power generation system with reference to a simulation waveform.

Figure 11:
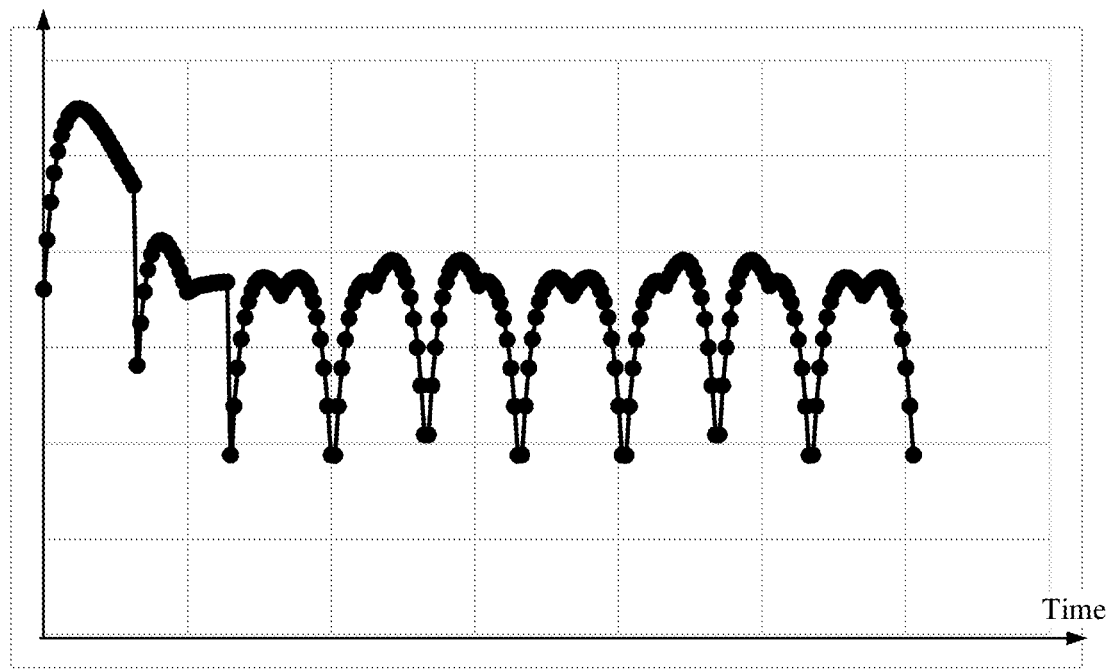
FIG. 11 is a schematic diagram of an output power when a photovoltaic power generation system performs online IV curve scanning according to an embodiment.

FIG. 11 is a schematic diagram of an output power when a photovoltaic power generation system performs online IV curve scanning according to an embodiment.

To show the embodiment more clearly, the figure is a schematic diagram when three DC-DC circuits cyclically perform online IV curve scanning. It can be learned from the accompanying drawing that, the first DC-DC circuit first starts scanning, and then a plurality of DC-DC circuits may simultaneously perform scanning in a period of time. However, the DC-DC circuits that simultaneously perform scanning start scanning at different time points, that is, perform staggered output, in the DC-DC circuits that simultaneously perform scanning, output powers of several DC-DC circuits are low, and output powers of other DC-DC circuits are high, so that after the output powers of all the DC-DC circuits are superimposed, a total output power of the photovoltaic power generation system remains stable, thereby avoiding a sharp fluctuation.

In conclusion, according to the photovoltaic power generation system provided in this embodiment, online IV curve scanning can be simultaneously performed on photovoltaic units connected to a plurality of DC-DC circuits. This saves scanning time. In addition, a total output power of the photovoltaic power generation system can be stable. This avoids a sharp fluctuation of the total output power during online IV curve scanning, and further reduces negative impact of online IV curve scanning on grid-connected power quality.

The following describes still another implementation of the photovoltaic power generation system.

Figure 12:
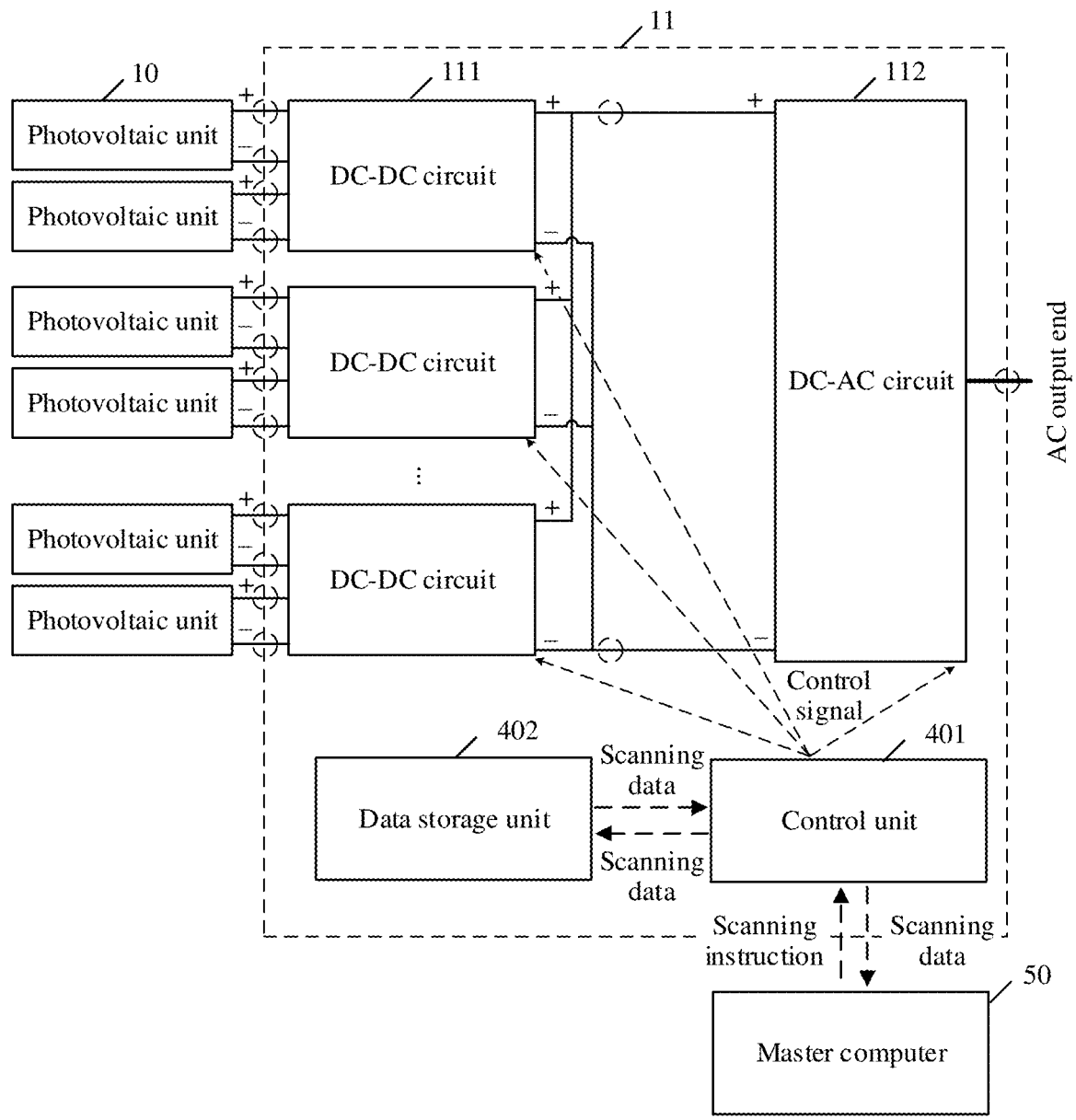
FIG. 12 is a schematic diagram of still another photovoltaic power generation system according to an embodiment.

FIG. 12 is a schematic diagram of still another photovoltaic power generation system according to an embodiment.

The photovoltaic power generation system is a photovoltaic power generation system based on a string inverter. Refer to related descriptions corresponding to FIG. 2.

The photovoltaic power generation system further includes the DC-AC circuit (which may also be referred to as an inverter circuit) 112, and M groups of DC-DC circuits 111 and the DC-AC circuit 112 form the string inverter 11. A positive output end of each DC-DC circuit is connected in parallel to a positive input end of the DC-AC circuit 112, and a negative output end of each DC-DC circuit is connected in parallel to a negative input end of the DC-AC circuit 112.

The DC-AC circuit 112 is configured to convert a DC input by the DC-DC circuit into an AC and then output the AC.

The control unit 401 may be further integrated with a controller of the DC-AC circuit 112, in other words, the controller may further control a control status of the DC-AC circuit 112.

In some embodiments, the controller is a controller of the string inverter 11.

For a working principle of the controller, refer to the descriptions in the foregoing embodiments, and details are not described herein again.

For each group of DC-DC circuits of the string inverter 11, after a first DC-DC circuit starts online IV curve scanning, other DC-DC circuits sequentially perform online IV curve scanning rather than starting scanning after a previous DC-DC circuit completes scanning. In addition, a time interval is less than duration of online IV curve scanning performed by one DC-DC circuit, that is, interleaved scanning is implemented. In this case, N DC-DC circuits in each group of DC-DC circuits perform staggered output. Therefore, online IV curve scanning can be simultaneously performed on photovoltaic units connected to a plurality of DC-DC circuits. This saves scanning time. In addition, a total output power of the string inverter 11 can be stable. This reduces negative impact of the string inverter 11 on grid-connected power quality during online IV curve scanning.

The following describes yet another implementation of the photovoltaic power generation system.

Figure 13:
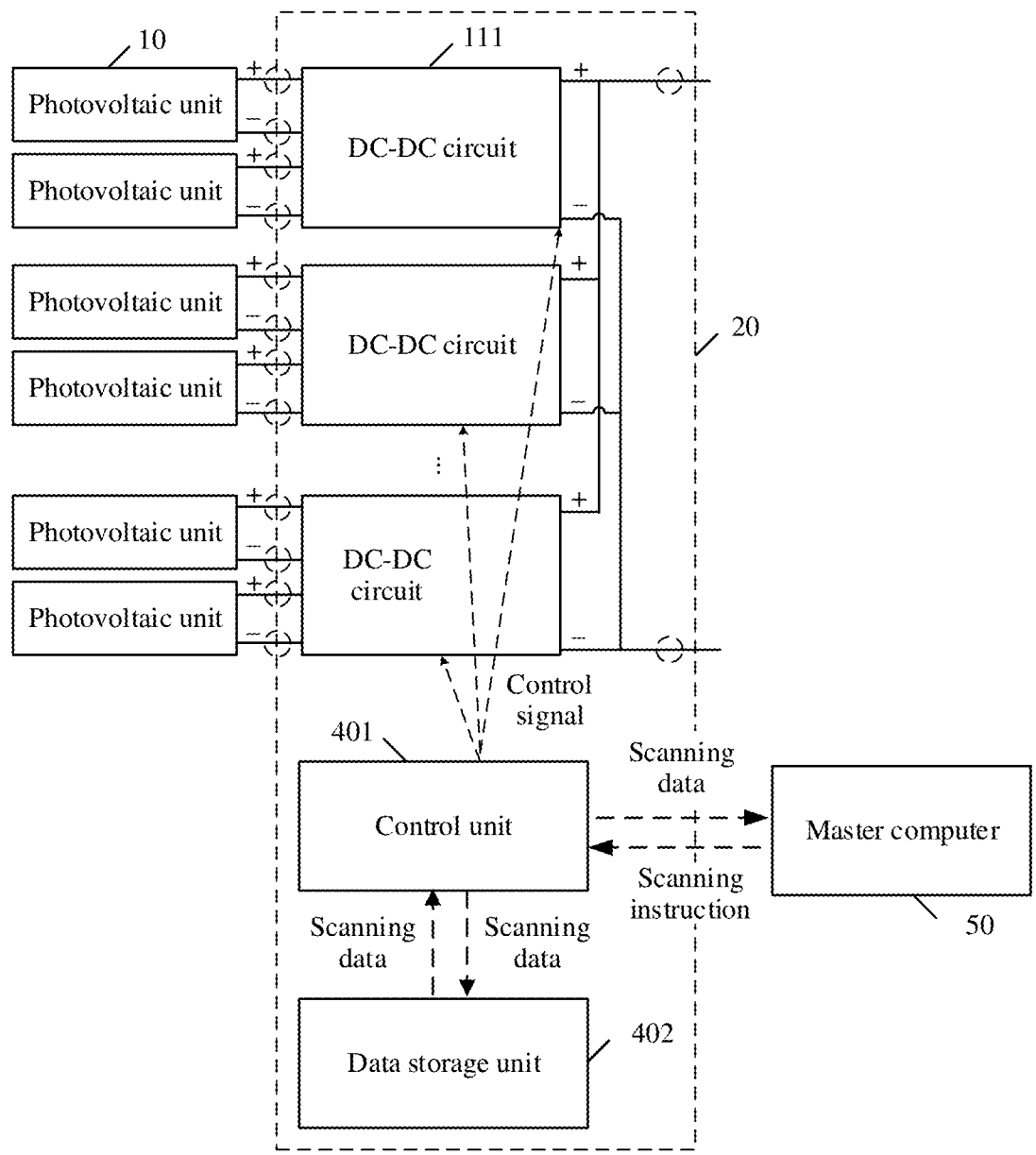
FIG. 13 is a schematic diagram of yet another photovoltaic power generation system according to an embodiment.

FIG. 13 is a schematic diagram of yet another photovoltaic power generation system according to an embodiment.

The photovoltaic power generation system includes a DC combiner box 20. Refer to related descriptions corresponding to FIG. 4.

In this case, positive output ends of M groups of DC-DC circuits are connected in parallel to form a positive output end of the DC combiner box 20, and negative output ends of the M groups of DC-DC circuits are connected in parallel to form a negative output end of the DC combiner box.

For a working principle of a controller, refer to the descriptions in the foregoing embodiments, and details are not described herein again.

In some embodiments, the DC combiner box 20 is an MPPT boost combiner box and is configured to: perform DC conversion on a DC input by the photovoltaic unit and track a maximum power point of the photovoltaic unit.

An output end of the DC combiner box 20 may be connected to a DC load or an inverter.

In this case, the controller may be integrated with a controller of the DC combiner box 20. For a working principle of the controller, refer to the descriptions in the foregoing embodiments, and details are not described herein again.

For each group of DC-DC circuits of the DC combiner box 20, after a first DC-DC circuit starts online IV curve scanning, other DC-DC circuits sequentially perform online IV curve scanning rather than starting scanning after a previous DC-DC circuit completes scanning. In addition, a time interval is less than duration of online IV curve scanning performed by one DC-DC circuit, that is, interleaved scanning is implemented. In this case, N DC-DC circuits in each group of DC-DC circuits perform staggered output. Therefore, online IV curve scanning can be simultaneously performed on photovoltaic units connected to a plurality of DC-DC circuits. This saves scanning time. In addition, a total output power of the DC combiner box 20 can be stable. This reduces negative impact of the DC combiner box 20 on grid-connected power quality during online IV curve scanning.

The following describes still yet another implementation of the photovoltaic power generation system.

Figure 14:
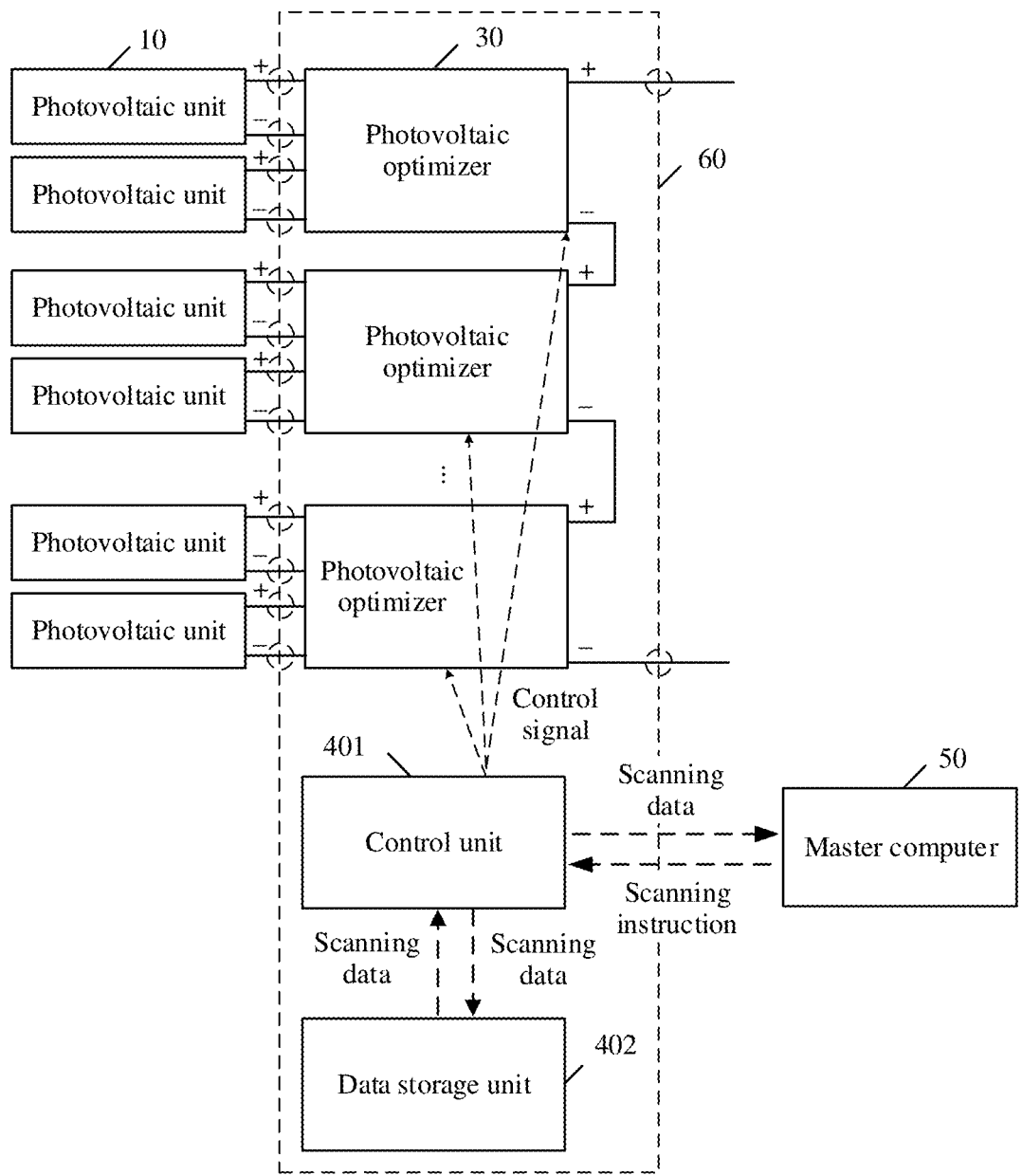
FIG. 14 is a schematic diagram of still yet another photovoltaic power generation system according to an embodiment.

FIG. 14 is a schematic diagram of still yet another photovoltaic power generation system according to an embodiment.

The photovoltaic power generation system includes the photovoltaic optimizer 30. Refer to related descriptions corresponding to FIG. 6.

The photovoltaic optimizer 30 includes a DC-DC circuit and is configured to increase or decrease a DC input by a photovoltaic module and then output the DC. In this case, the photovoltaic power generation system includes M groups of photovoltaic optimizers, and each group of photovoltaic optimizers include N photovoltaic optimizers.

In a photovoltaic power generation system in which the photovoltaic optimizer 30 is used, a plurality of photovoltaic optimizers 30 may be connected in series to form a photovoltaic optimizer substring 60.

For example, the N photovoltaic optimizers in each group of photovoltaic optimizers are connected in series in a head-to-tail manner. A positive output end of an $i^{th}$ photovoltaic optimizer is connected to a negative output end of an $(i-1)^{th}$ photovoltaic optimizer, and a negative output end of the $i^{th}$ photovoltaic optimizer is connected to a positive output end of an $(i+1)^{th}$ photovoltaic optimizer, where i=2, 3, . . . , N−1. A positive output end of a first photovoltaic optimizer is used as a positive output end of the photovoltaic optimizer substring 60, and a negative output end of an $N^{th}$ photovoltaic optimizer is used as a negative output end of the photovoltaic optimizer substring 60. An output end of the photovoltaic optimizer substring 60 is connected to an input end of a downstream MPPT boost combiner box, a string inverter, or a central inverter through a DC power cable.

In a possible implementation, a controller may be integrated with a controller of the photovoltaic optimizer. In this case, a quantity of controllers is the same as a quantity of photovoltaic optimizers. The master computer 50 simultaneously delivers a scanning instruction to all controllers.

In another possible implementation, a controller and a controller of the photovoltaic optimizer are separately disposed, and one controller or several controllers can control all the photovoltaic optimizers to perform online IV curve scanning.

For a working principle of the controller, refer to the descriptions in the foregoing embodiments, and details are not described herein again.

For a photovoltaic power generation system in which the photovoltaic optimizer substring 60 is used, after a first photovoltaic optimizer starts online IV curve scanning, other photovoltaic optimizers sequentially perform online IV curve scanning rather than starting scanning after a previous photovoltaic optimizer completes scanning. In addition, a time interval is less than duration of online IV curve scanning performed by one photovoltaic optimizer, and interleaved scanning is implemented. In this case, the photovoltaic optimizers perform staggered output. Therefore, online IV curve scanning can be simultaneously performed on photovoltaic units connected to a plurality of photovoltaic optimizers. This saves scanning time. In addition, a total output power of the photovoltaic optimizer substring 60 can be stable. This reduces negative impact of the photovoltaic optimizer substring 60 on grid-connected power quality during online IV curve scanning.

Based on the photovoltaic power generation system provided in the foregoing embodiments, an embodiment may further provide an online IV curve scanning method, applied to a photovoltaic power generation system. The photovoltaic power generation system includes a photovoltaic unit and M groups of DC-DC circuits. Each group of DC-DC circuits include N DC-DC circuits, where M is a positive integer, and N is an integer greater than 1. An input end of each DC-DC circuit is connected to at least one photovoltaic unit, and each photovoltaic unit includes at least one photovoltaic module. The method includes:

controlling N DC-DC circuits in each group of DC-DC circuits to sequentially start online IV curve scanning, and controlling a time interval at which two adjacent DC-DC circuits start online IV curve scanning to be less than duration of online IV curve scanning performed by one DC-DC circuit.

The following provides descriptions with reference to the accompanying drawing. The following method uses an example in which N DC-DC circuits in one group are controlled to perform online IV curve scanning Other groups of DC-DC circuits can be synchronously controlled by using the same method.

Figure 15:
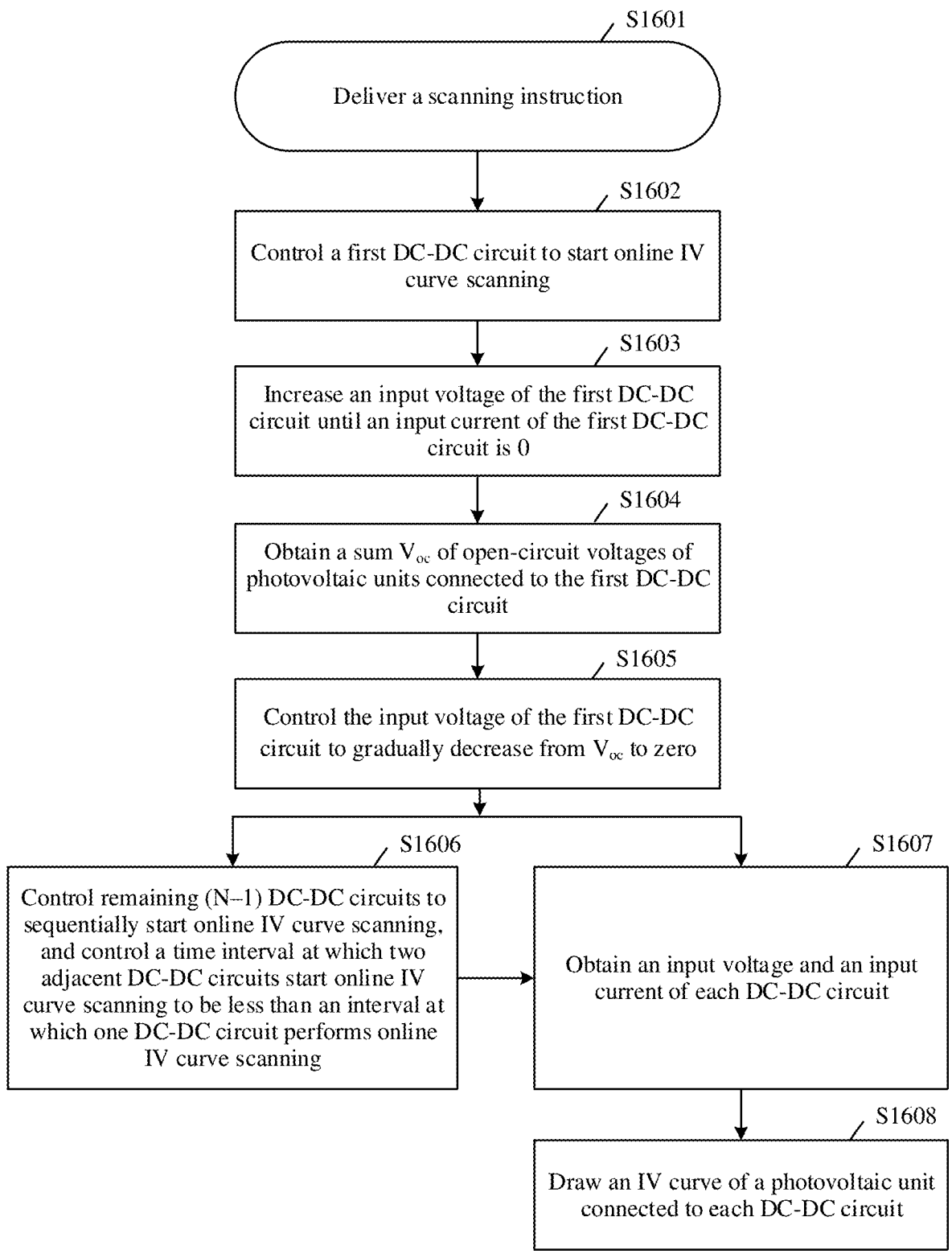
FIG. 15 is a flowchart of an online IV curve scanning method according to an embodiment.

FIG. 15 is a flowchart of an online IV curve scanning method according to an embodiment.

The method includes the following steps.

S1601: Deliver a scanning instruction.

The scanning instruction instructs N DC-DC circuits in each group of DC-DC circuits to perform online IV curve scanning.

S1602: Control a first DC-DC circuit to start online IV curve scanning.

S1603: Increase an input voltage of the first DC-DC circuit until an input current of the first DC-DC circuit is 0.

In this case, the input voltage of the DC-DC circuit is a sum $V_{oc}$ of open-circuit voltages of connected photovoltaic units.

S1604: Obtain the sum $V_{oc}$ of the open-circuit voltages of the photovoltaic units connected to the first DC-DC circuit.

S1605: Control the input voltage of the first DC-DC circuit to gradually decrease from $V_{oc}$ to zero.

S1606: Control remaining (N−1) DC-DC circuits to sequentially start online IV curve scanning and control a time interval at which two adjacent DC-DC circuits start online IV curve scanning to be less than duration of online IV curve scanning performed by one DC-DC circuit.

In this step, control may be performed based on a voltage or time interval. Details are described below.

Manner 1: Control is performed based on the voltage.

The first DC-DC circuit in the N DC-DC circuits is first controlled to start online IV curve scanning, and then a $k^{th}$ DC-DC circuit in the remaining (N−1) DC-DC circuits is controlled to start online IV curve scanning when an input voltage of a $(k-1)^{th}$ DC-DC circuit decreases to be less than a preset voltage threshold, so that a time interval is less than duration of online IV curve scanning performed by one DC-DC circuit. $k=2, 3, \ldots, N$.

The preset voltage threshold is positively correlated to a value of N. More DC-DC circuits connected to the photovoltaic system indicate a higher power of the photovoltaic power generation system. In this case, the preset voltage threshold may be increased, to shorten duration of online IV curve scanning while maintaining a stable total output power of the photovoltaic power generation system.

In some embodiments, a moment for starting online IV curve scanning is determined based on $V_{oc}$ obtained when a previous DC-DC circuit performs IV curve scanning. In other words, the preset voltage threshold is a product of a first preset proportion and a sum of open-circuit voltages of all photovoltaic units connected to the $(k-1)^{th}$ DC-DC circuit.

In some other embodiments, the preset voltage threshold is a product of a first preset proportion and a sum of preset open-circuit voltages of photovoltaic units connected to the $(k-1)^{th}$ DC-DC circuit. A rated open-circuit voltage range of each photovoltaic unit is a known device parameter. The preset open-circuit voltage may be determined based on the rated open-circuit voltage range. For example, a greatest value, a smallest value, or an intermediate value within the rated open-circuit voltage range is selected.

Manner 2: Control is performed based on the time interval.

A first DC-DC circuit is first controlled to start online IV curve scanning, and then other DC-DC circuits are controlled to sequentially start, at a preset interval, online IV curve scanning.

In some embodiments, the preset time interval is negatively correlated to a value of N. More DC-DC circuits connected to the photovoltaic system indicate a higher power of the photovoltaic power generation system. In this case, the preset time interval may be reduced, to shorten duration of online IV curve scanning while maintaining a stable total output power of the photovoltaic power generation system.

S1607: Obtain an input voltage and an input current of each DC-DC circuit.

S1608: Draw an IV curve of a photovoltaic unit connected to each DC-DC circuit.

Division of the foregoing steps is merely for ease of description and does not constitute a limitation on the method. A person skilled in the art may further use another possible implementation without departing from a principle of the method. For example, after all DC-DC circuits complete online IV curve scanning, the IV curve is drawn.

In conclusion, according to the method provided in the embodiments, after the first DC-DC circuit starts online IV curve scanning, other DC-DC circuits sequentially perform online IV curve scanning rather than starting scanning after a previous DC-DC circuit completes scanning, and the time interval is less than duration of online IV curve scanning performed by a single DC-DC circuit, that is, interleaved scanning is implemented. In this case, the N DC-DC circuits in each group of DC-DC circuits perform staggered output. On one hand, online IV curve scanning can be simultaneously performed on photovoltaic units connected to a plurality of DC-DC circuits. This saves scanning time. On the other hand, a total output power of the photovoltaic power generation system can be stable. This avoids a sharp fluctuation of the total output power during online IV curve scanning, and further reduces negative impact of online IV curve scanning on grid-connected power quality.

An embodiment may further provide a photovoltaic inverter. The following provides descriptions with reference to the accompanying drawings.

Figure 16:
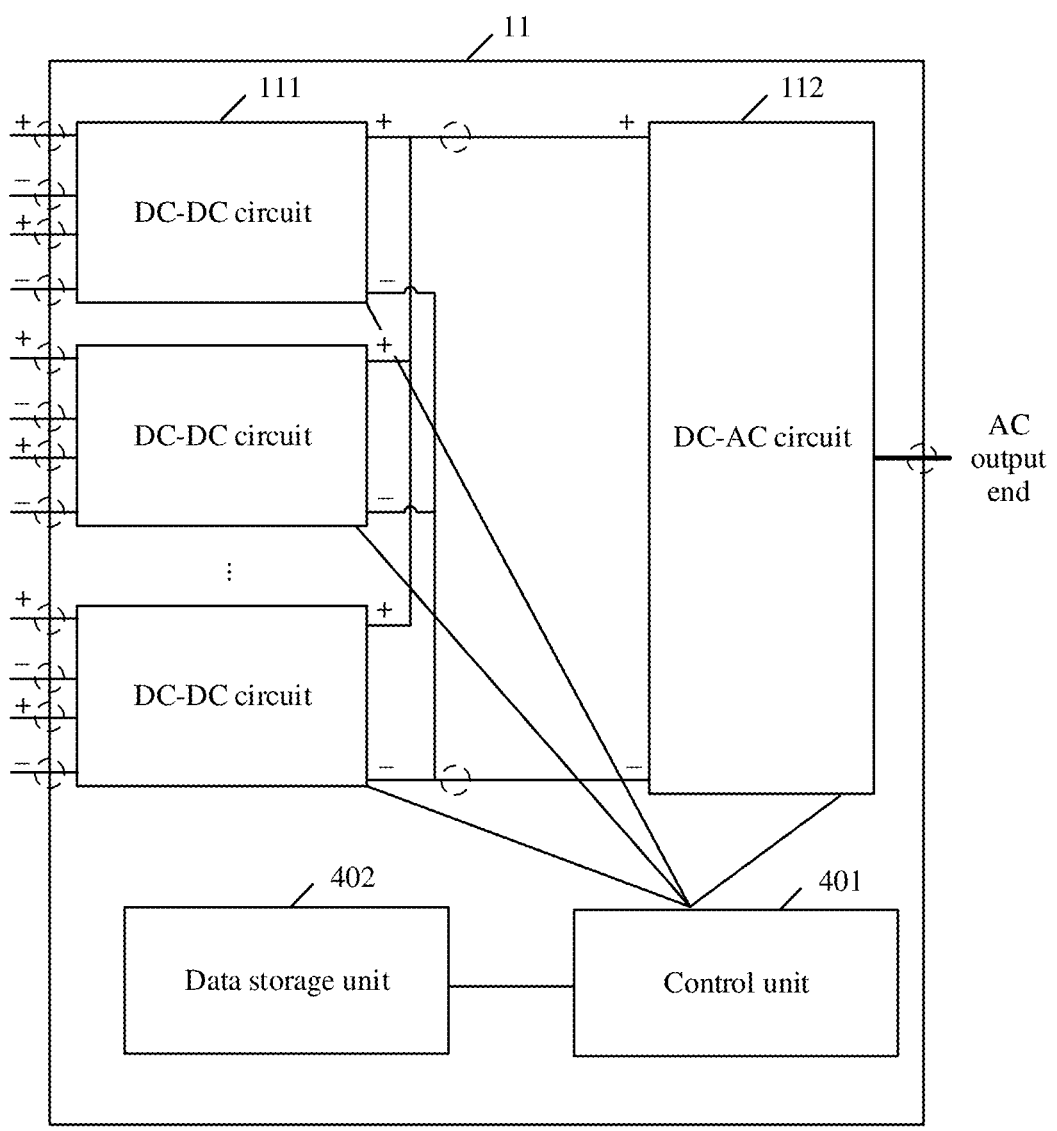
FIG. 16 is a schematic diagram of a photovoltaic inverter according to an embodiment.

FIG. 16 is a schematic diagram of a photovoltaic inverter according to an embodiment.

The photovoltaic inverter 11 includes the M groups of DC-DC circuits 111, the DC-AC circuits 112, and a controller. M is a positive integer. The controller includes the control unit 401 and the data storage unit 402.

Each group of DC-DC circuits include N DC-DC circuits. N is an integer greater than 1.

An input end of each DC-DC circuit 111 is connected to at least one photovoltaic unit, and each photovoltaic unit includes at least one photovoltaic module.

A positive input end of the DC-DC circuit 111 is connected to a positive output end of the photovoltaic unit, and a negative input end of the DC-DC circuit 111 is connected to a negative output end of the photovoltaic unit. A positive output end of each DC-DC circuit is connected in parallel to a positive input end of the DC-AC circuit 112, and a negative output end of each DC-DC circuit is connected in parallel to a negative input end of the DC-AC circuit.

The DC-DC circuit 111 is configured to perform DC conversion on a DC obtained from the photovoltaic unit and then transmit a converted DC to the DC-AC circuit 112.

The DC-AC circuit 112 is configured to convert the obtained DC into an AC.

When controlling each DC-DC circuit to perform online IV curve scanning, the controller first increases an input voltage of the DC-DC circuit until an input current of the DC-DC circuit is zero. In this case, the input voltage of the DC-DC circuit is a sum of open-circuit voltages of all connected photovoltaic units. In this case, the open-circuit voltage is obtained, and a result is transmitted to the master computer and/or stored in the data storage unit 402.

Then, the controller controls the input voltage of the DC-DC circuit to gradually decrease to zero, and in this process, obtains a correspondence between the input voltage and the input current of the DC-DC circuit based on a preset sampling interval, to obtain an IV curve scanning result. When the input voltage is zero, a corresponding input current is a sum of short-circuit currents of all photovoltaic units 10 connected to the DC-DC circuit.

For N DC-DC circuits, the controller controls the N DC-DC circuits in each group of DC-DC circuits to sequentially start online IV curve scanning and controls a time interval at which two adjacent DC-DC circuits start online IV curve scanning to be less than duration of online IV curve scanning performed by one DC-DC circuit.

In a possible implementation, the controller first controls a first DC-DC circuit to start online IV curve scanning, and controls a $k^{th}$ DC-DC circuit in the remaining (N−1) DC-DC circuits to start online IV curve scanning when an input voltage of a $(k-1)^{th}$ DC-DC circuit decreases to be less than a preset voltage threshold, so that a time interval is less than the duration of online IV curve scanning performed by one DC-DC circuit. k=2, 3, . . . , N.

In some embodiments, the preset voltage threshold is positively correlated to a value of N. More DC-DC circuits connected to the photovoltaic system indicate a higher power of the photovoltaic power generation system. In this case, the preset voltage threshold may be increased, to shorten duration of online IV curve scanning while maintaining a stable total output power of the photovoltaic power generation system.

In some embodiments, a moment for starting online IV curve scanning is determined based on $V_{oc}$ obtained when a previous DC-DC circuit performs IV curve scanning. In other words, the preset voltage threshold is a product of a first preset proportion and a sum of open-circuit voltages of all photovoltaic units connected to the $(k-1)^{th}$ DC-DC circuit.

In some other embodiments, the preset voltage threshold is a product of a first preset proportion and a sum of preset open-circuit voltages of photovoltaic units connected to the $(k-1)^{th}$ DC-DC circuit. A rated open-circuit voltage range of each photovoltaic unit is a known device parameter. Each preset open-circuit voltage may be determined based on the rated open-circuit voltage range. For example, a greatest value, a smallest value, or an intermediate value within the rated open-circuit voltage range is selected.

In another possible implementation, the controller first controls a first DC-DC circuit to start online IV curve scanning, and then controls other DC-DC circuits to sequentially start online IV curve scanning at a preset time interval.

In some embodiments, the preset time interval is negatively correlated to a value of N. More DC-DC circuits connected to the photovoltaic system indicate a higher power of the photovoltaic power generation system. In this case, the preset time interval may be reduced, to shorten duration of online IV curve scanning while maintaining a stable total output power of the photovoltaic power generation system.

The preset time interval is a product of a second preset proportion and the duration of online IV curve scanning performed by one DC-DC circuit.

In conclusion, for each group of DC-DC circuits of the photovoltaic inverter, after a first DC-DC circuit starts online IV curve scanning, other DC-DC circuits sequentially perform online IV curve scanning rather than starting scanning after a previous DC-DC circuit completes scanning. In addition, a time interval is less than duration of online IV curve scanning performed by the first DC-DC circuit, that is, interleaved scanning is implemented. In this case, N DC-DC circuits in each group of DC-DC circuits perform staggered output. On one hand, online IV curve scanning can be simultaneously performed on photovoltaic units connected to a plurality of DC-DC circuits. This saves scanning time. On the other hand, a total output power of the photovoltaic inverter can be stable. This avoids a sharp fluctuation of the total output power during online IV curve scanning, and further reduces negative impact of the online IV curve scanning photovoltaic inverter on grid-connected power quality.

An embodiment may further provide a DC combiner box. The following provides descriptions with reference to the accompanying drawing.

Figure 17:
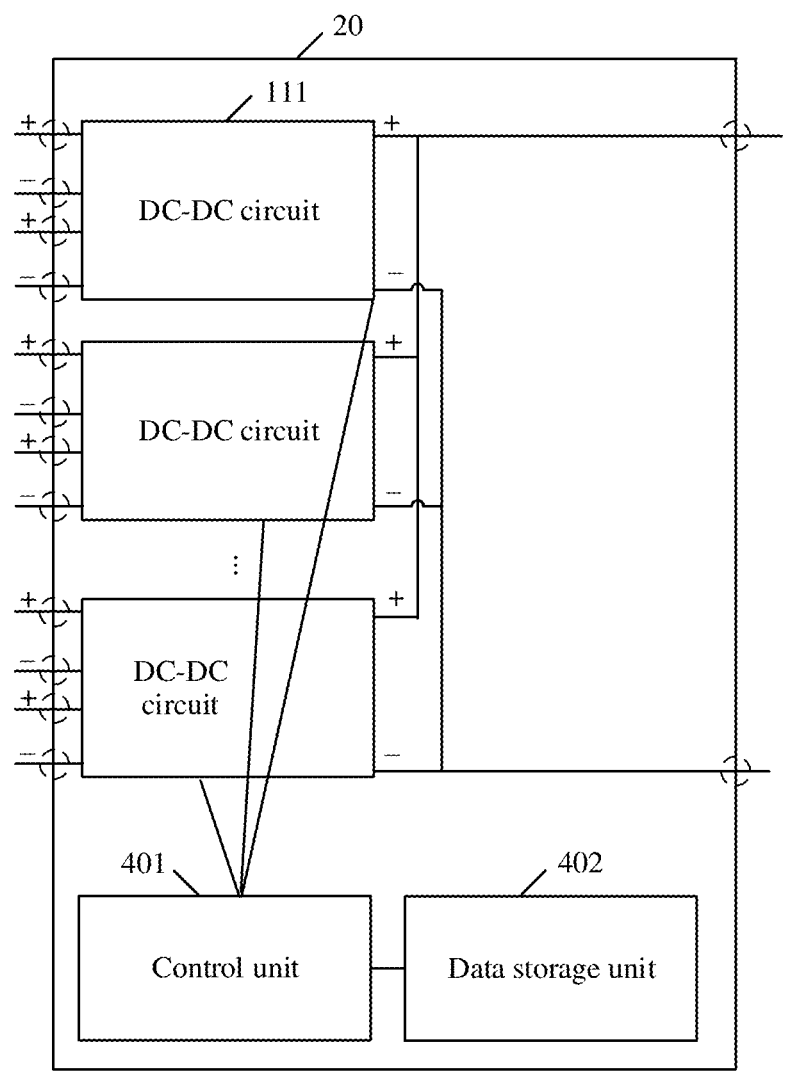
FIG. 17 is a schematic diagram of a DC combiner box according to an embodiment.

FIG. 17 is a schematic diagram of a DC combiner box according to an embodiment.

The DC combiner box 20 includes a controller and the M groups of DC-DC circuits 111. M is a positive integer. The controller includes the control unit 401 and the data storage unit 402.

An input end of each DC-DC circuit 111 is connected to at least one photovoltaic unit, and each photovoltaic unit includes at least one photovoltaic module.

A positive input end of the DC-DC circuit 111 is connected to a positive output end of the photovoltaic unit, and a negative input end of the DC-DC circuit 111 is connected to a negative output end of the photovoltaic unit.

Positive output ends of the M groups of DC-DC circuits 111 are connected in parallel to form a positive output end of the DC combiner box 20.

Negative output ends of the M groups of DC-DC circuits 111 are connected in parallel to form a negative output end of the DC combiner box 20.

The controller controls the N DC-DC circuits in each group of DC-DC circuits to sequentially start online IV curve scanning and controls a time interval at which two adjacent DC-DC circuits start online IV curve scanning to be less than duration of online IV curve scanning performed by one DC-DC circuit.

For a control manner of the controller, refer to the descriptions in the foregoing embodiments. Details are not described herein again in this embodiment.

In conclusion, according to the DC combiner box, online IV curve scanning can be simultaneously performed on photovoltaic units connected to a plurality of DC-DC circuits. This saves scanning time. In addition, a total output power of a photovoltaic inverter can be stable. This avoids a sharp fluctuation of the total output power during online IV curve scanning, and further reduces negative impact of the online IV curve scanning photovoltaic inverter on grid-connected power quality.

An embodiment may further provide a photovoltaic optimizer. The following provides descriptions with reference to the accompanying drawing.

Figure 18:
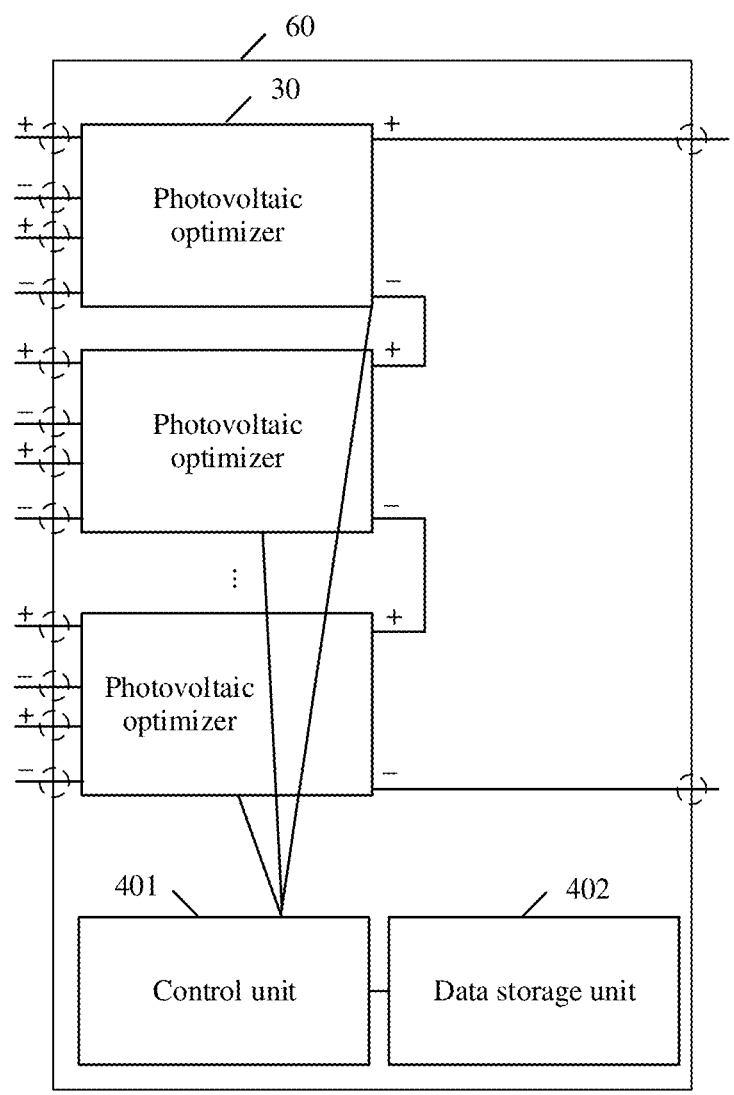
FIG. 18 is a schematic diagram of a photovoltaic inverter substring according to an embodiment.

FIG. 18 is a schematic diagram of a photovoltaic inverter substring according to an embodiment.

The photovoltaic optimizer 30 includes a DC-DC circuit and is configured to increase or decrease a DC input by a photovoltaic module and then output the DC. In this case, a photovoltaic power generation system includes M groups of photovoltaic optimizers, and each group of photovoltaic optimizers include N photovoltaic optimizers.

An input end of the DC-DC circuit is connected to at least one photovoltaic unit, and each photovoltaic unit includes at least one photovoltaic module.

A positive input end (that is, a positive input end of the photovoltaic optimizer 30) of the DC-DC circuit is connected to a positive output end of the photovoltaic unit, and a negative input end (that is, a negative input end of the photovoltaic optimizer 30) of the DC-DC circuit is connected to a negative output end of the photovoltaic unit.

A positive output end of the DC-DC circuit is a positive output end of the photovoltaic optimizer 30, and a negative output end of the DC-DC circuit is a negative output end of the photovoltaic optimizer 30.

In a photovoltaic power generation system in which the photovoltaic optimizer 30 is used, a plurality of photovoltaic optimizers 30 may be connected in series to form a photovoltaic optimizer substring 60.

For example, the N photovoltaic optimizers in each group of photovoltaic optimizers are connected in series in a head-to-tail manner. A positive output end of an $i^{th}$ photovoltaic optimizer is connected to a negative output end of an $(i-1)^{th}$ photovoltaic optimizer, and a negative output end of the $i^{th}$ photovoltaic optimizer is connected to a positive output end of an $(i+1)^{th}$ photovoltaic optimizer, where i=2, 3, . . . , N−1. A positive output end of a first photovoltaic optimizer is used as a positive output end of the photovoltaic optimizer substring 60, and a negative output end of an $N^{th}$ photovoltaic optimizer is used as a negative output end of the photovoltaic optimizer substring 60.

M formed photovoltaic optimizer substrings 60 may be further connected in series.

An output end of the photovoltaic optimizer substring 60 is connected to an input end of a downstream MPPT boost combiner box, a string inverter, or a central inverter through a DC power cable.

In a possible implementation, a controller may be integrated with a controller of the photovoltaic optimizer. In this case, a quantity of controllers is the same as a quantity of photovoltaic optimizers. The master computer simultaneously delivers a scanning instruction to all controllers.

In another possible implementation, a controller and a controller of the photovoltaic optimizer are separately disposed, and one controller or several controllers can control all the photovoltaic optimizers to perform online IV curve scanning. For example, one controller controls one photovoltaic optimizer substring 60.

For a control manner of the controller, refer to the descriptions in the foregoing embodiments. Details are not described herein again in this embodiment.

Accordingly, for a photovoltaic power generation system in which the photovoltaic optimizer substring is used, online IV curve scanning can be simultaneously performed on photovoltaic units connected to a plurality of DC-DC circuits. This saves scanning time. In addition, a total output power of a photovoltaic inverter can be stable. This avoids a sharp fluctuation of the total output power during online IV curve scanning, and further reduces negative impact of the online IV curve scanning photovoltaic inverter on grid-connected power quality.

It should be understood that, "at least one piece (item)" means one or more and "a plurality of" means two or more. The term "and/or" is used to describe an association relationship between associated objects and indicates that three relationships may exist. For example, "A and/or B" may indicate the following three cases: only A exists, only B exists, and both A and B exist, where A and B may be singular or plural. The character "I" may indicate an "or" relationship between the associated objects. "At least one of the following items (pieces)" or a similar expression thereof means any combination of these items, including any combination of singular items (pieces) or plural items (pieces). For example, at least one item (piece) of a, b, or c may indicate a, b, c, "a and b", "a and c", "b and c", or "a, b, and c", where a, b, and c may be singular or plural.

The embodiments are all described in a progressive manner, for same or similar parts in embodiments, refer to these embodiments, and each embodiment focuses on a difference from other embodiments. In addition, some or all of the units and modules may be selected based on an actual requirement to achieve objectives of the solutions of embodiments. A person of ordinary skill in the art may understand and implement embodiments without creative efforts.

The foregoing descriptions are merely implementations. It should be noted that a person of ordinary skill in the art can further make several improvements and modifications without departing from the principles of the embodiments, and these improvements and modifications shall fall within the scope of the embodiments.

What is claimed is:

1. A photovoltaic power generation system, wherein the photovoltaic power generation system comprises a controller and M groups of DC-DC circuits, each group of DC-DC circuits comprise N DC-DC circuits, M is a positive integer, and N is an integer greater than 1;
   an input end of each DC-DC circuit is configured to connect to at least one photovoltaic unit, and each photovoltaic unit comprises at least one photovoltaic module; and
   the controller is configured to:
   control the N DC-DC circuits in each group of DC-DC circuits to sequentially start online IV curve scanning, and
   control a time interval at which two adjacent DC-DC circuits start online IV curve scanning to be less than duration of online IV curve scanning performed by one DC-DC circuit.

2. The photovoltaic power generation system according to claim 1, wherein when controlling each DC-DC circuit to perform online IV curve scanning, the controller is further configured to:
   increase an input voltage of the DC-DC circuit until an input current of the DC-DC circuit is zero, and
   control the input voltage of the DC-DC circuit to gradually decrease to zero.

3. The photovoltaic power generation system according to claim 2, wherein the controller is further configured to:
   after controlling a first DC-DC circuit in each group of DC-DC circuits to start online IV curve scanning,
   control a $k^{th}$ DC-DC circuit to start online IV curve scanning when an input voltage of a $(k-1)^{th}$ DC-DC circuit decreases to be less than a preset voltage threshold, wherein k=2, 3, ..., N.

4. The photovoltaic power generation system according to claim 3, wherein a duration of online IV curve scanning performed by all DC-DC circuits is the same, and the preset voltage threshold is a product of a first preset proportion and a sum of open-circuit voltages of all photovoltaic units connected to the $(k-1)^{th}$ DC-DC circuit.

5. The photovoltaic power generation system according to claim 3, wherein the preset voltage threshold is a product of a first preset proportion and a sum of preset open-circuit voltages of photovoltaic units connected to the $(k-1)^{th}$ DC-DC circuit.

6. The photovoltaic power generation system according to claim 2, wherein the controller is configured to:
   after controlling a first DC-DC circuit in each group of DC-DC circuits to start online IV curve scanning,
   control other DC-DC circuits to sequentially start online IV curve scanning at a preset time interval, wherein the preset time interval is less than the duration of online IV curve scanning performed by one DC-DC circuit.

7. The photovoltaic power generation system according to claim 6, wherein the preset time interval is negatively correlated to a value of N.

8. The photovoltaic power generation system according to claim 6, wherein the preset time interval is a product of a second preset proportion and the duration of online IV curve scanning performed by one DC-DC circuit.

9. The photovoltaic power generation system according to claim 1, wherein the controller is further configured to controls the M groups of DC-DC circuits to synchronously perform online IV curve scanning.

10. The photovoltaic power generation system according to claim 1, wherein the photovoltaic power generation system further comprises a DC-AC circuit, and the DC-AC circuit and the M groups of DC-DC circuits form an inverter; and
    positive output ends of the M groups of DC-DC circuits are connected in parallel to a positive input end of the DC-AC circuit, and negative output ends of the M groups of DC-DC circuits are connected in parallel to a negative input end of the DC-AC circuit.

11. The photovoltaic power generation system according to claim 10, wherein the controller is further configured to control a working status of the DC-AC circuit.

12. The photovoltaic power generation system according to claim 1, wherein the M groups of DC-DC circuits form a DC combiner box;
    positive output ends of the M groups of DC-DC circuits are connected in parallel to form a positive output end of the DC combiner box; and
    negative output ends of the M groups of DC-DC circuits are connected in parallel to form a negative output end of the DC combiner box.

13. The photovoltaic power generation system according to claim 1, wherein the DC-DC circuit is a photovoltaic optimizer, and N photovoltaic optimizers in each group of photovoltaic optimizers form a photovoltaic optimizer substring; and
    a positive output end of an $i^{th}$ photovoltaic optimizer is connected to a negative output end of an $(i-1)^{th}$ photovoltaic optimizer, a negative output end of the $i^{th}$ photovoltaic optimizer is connected to a positive output end of an $(i+1)^{th}$ photovoltaic optimizer, a positive output end of a first photovoltaic optimizer is a positive output end of the photovoltaic optimizer substring, a negative output end of an $N^{th}$ photovoltaic optimizer is a negative output end of the photovoltaic optimizer substring, and i=2, 3, ..., N−1.

14. A photovoltaic inverter, configured to connect to a photovoltaic unit, wherein the photovoltaic unit comprises at least one photovoltaic module, the photovoltaic inverter comprises a controller, a DC-AC circuit, and M groups of DC-DC circuits, each group of DC-DC circuits comprise N DC-DC circuits, M is a positive integer, and N is an integer greater than 1;
    positive output ends of the M groups of DC-DC circuits are connected in parallel to a positive input end of the DC-AC circuit, negative output ends of the M groups of DC-DC circuits are connected in parallel to a negative input end of the DC-AC circuit, and an input end of each DC-DC circuit is connected to at least one photovoltaic unit;
    the DC-DC circuit is configured to perform DC conversion on a DC obtained from the photovoltaic unit and then transmit a converted DC to the DC-AC circuit;
    the DC-AC circuit is configured to convert the obtained DC into an AC; and the controller is configured to:
control the N DC-DC circuits in each group of DC-DC circuits to sequentially start online IV curve scanning, and
control a time interval at which two adjacent DC-DC circuits start online IV curve scanning to be less than duration of online IV curve scanning performed by one DC-DC circuit.

15. The photovoltaic inverter according to claim 14, wherein when controlling each DC-DC circuit to sequentially perform online IV curve scanning, the controller first increases an input voltage of the DC-DC circuit until an input current of the DC-DC circuit is zero, and then controls the input voltage of the DC-DC circuit to gradually decrease to zero.

16. The photovoltaic inverter according to claim 15, wherein the controller is further—configured to:
after controlling a first DC-DC circuit in each group of DC-DC circuits to start online IV curve scanning,
control a $k^{th}$ DC-DC circuit to start online IV curve scanning when an input voltage of a $(k-1)^{th}$ DC-DC circuit decreases to be less than a preset voltage threshold, wherein k=2, 3, . . . , N.

17. The photovoltaic inverter according to claim 16, wherein a duration of online IV curve scanning performed by all DC-DC circuits is the same, and the preset voltage threshold is a product of a first preset proportion and a sum of open-circuit voltages of all photovoltaic units connected to the $(k-1)^{th}$ DC-DC circuit.

18. The photovoltaic inverter according to claim 17, wherein the preset voltage threshold is a product of a first preset proportion and a sum of preset open-circuit voltages of photovoltaic units connected to the $(k-1)^{th}$ DC-DC circuit.

19. A DC combiner box, configured to connect to a photovoltaic unit, wherein the photovoltaic unit comprises at least one photovoltaic module, the DC combiner box comprises a controller and M groups of DC-DC circuits, each group of DC-DC circuits comprise N DC-DC circuits, M is a positive integer, and N is an integer greater than 1;
an input end of each DC-DC circuit is connected to at least one photovoltaic unit;
positive output ends of the M groups of DC-DC circuits are connected in parallel to form a positive output end of the DC combiner box;
negative output ends of the M groups of DC-DC circuits are connected in parallel to form a negative output end of the DC combiner box; and
the controller is configured to:
control the N DC-DC circuits in each group of DC-DC circuits to sequentially start online IV curve scanning, and
control a time interval at which two adjacent DC-DC circuits start online IV curve scanning to be less than duration of online IV curve scanning performed by one DC-DC circuit.

20. A photovoltaic optimizer, configured to connect to a photovoltaic unit, wherein the photovoltaic unit comprises at least one photovoltaic module, and is configured to connect in series to at least one photovoltaic optimizer to form a photovoltaic optimizer substring, and the photovoltaic optimizer comprises a controller and a DC-DC circuit;
an input end of the DC-DC circuit is connected to at least one photovoltaic unit;
a positive output end of the DC-DC circuit is a positive output end of the photovoltaic optimizer, and a negative output end of the DC-DC circuit is a negative output end of the photovoltaic optimizer; and
the controller is configured to:
control the DC-DC circuit to start online IV curve scanning, and
control a time interval at which the DC-DC circuit and a previous serially-connected photovoltaic optimizer start online IV curve scanning to be less than duration of online IV curve scanning performed by one DC-DC circuit.

* * * * *